United States Patent
Ozawa et al.

(10) Patent No.: US 7,545,054 B2
(45) Date of Patent: Jun. 9, 2009

(54) DC LINEAR REGULATOR SINGLE CONTROLLER WITH PLURAL LOADS

(75) Inventors: Hidekiyo Ozawa, Kasugai (JP); Morihito Hasegawa, Kasugai (JP); Toru Nakamura, Kasugai (JP)

(73) Assignee: Fujitsu Microelectronics Limited, Tokyo (JP)

( * ) Notice: Subject to any disclaimer, the term of this patent is extended or adjusted under 35 U.S.C. 154(b) by 270 days.

(21) Appl. No.: 11/447,009

(22) Filed: Jun. 6, 2006

(65) Prior Publication Data

US 2007/0194766 A1    Aug. 23, 2007

(30) Foreign Application Priority Data

Feb. 22, 2006    (JP)    ............................. 2006-045871

(51) Int. Cl.
*H02J 1/00*    (2006.01)
(52) U.S. Cl. ....................................... 307/32
(58) Field of Classification Search ................. 323/267, 323/269, 280; 307/32, 31
See application file for complete search history.

(56) References Cited

U.S. PATENT DOCUMENTS 4,849,868 A * 7/1989 Fisher ..................... 363/21.01

FOREIGN PATENT DOCUMENTS

| JP | 7-111314 A | 4/1995 |
|---|---|---|
| JP | 7-176624 A | 7/1995 |
| JP | 2005-166698 A | 6/2005 |

* cited by examiner

*Primary Examiner*—Shawn Riley
(74) *Attorney, Agent, or Firm*—Fujitsu Patent Center

(57) ABSTRACT

A DC-DC converter control circuit can maintain a relationship of voltages established among the output voltages even when the output voltages of DC-DC converters are independently controlled. A first reference voltage with which a high-potential back-gate voltage is controlled and a second reference voltage with which a supply voltage is controlled are dynamically controlled to be varied independently from one another. A supply voltage is applied to the inverting input terminal of a second differential-input amplifier. The second reference voltage is applied to the first non-inverting input terminal of the second differential-input amplifier, and the first reference voltage is applied to the second non-inverting input terminal thereof. The second differential-input amplifier amplifies the difference between a lower one of the first and second reference voltages applied to the two non-inverting input terminals thereof and the supply voltage applied to the inverting input terminal thereof.

18 Claims, 14 Drawing Sheets

CIRCUIT DIAGRAM OF POWER SUPPLY 10 OF FIRST EMBODIMENT

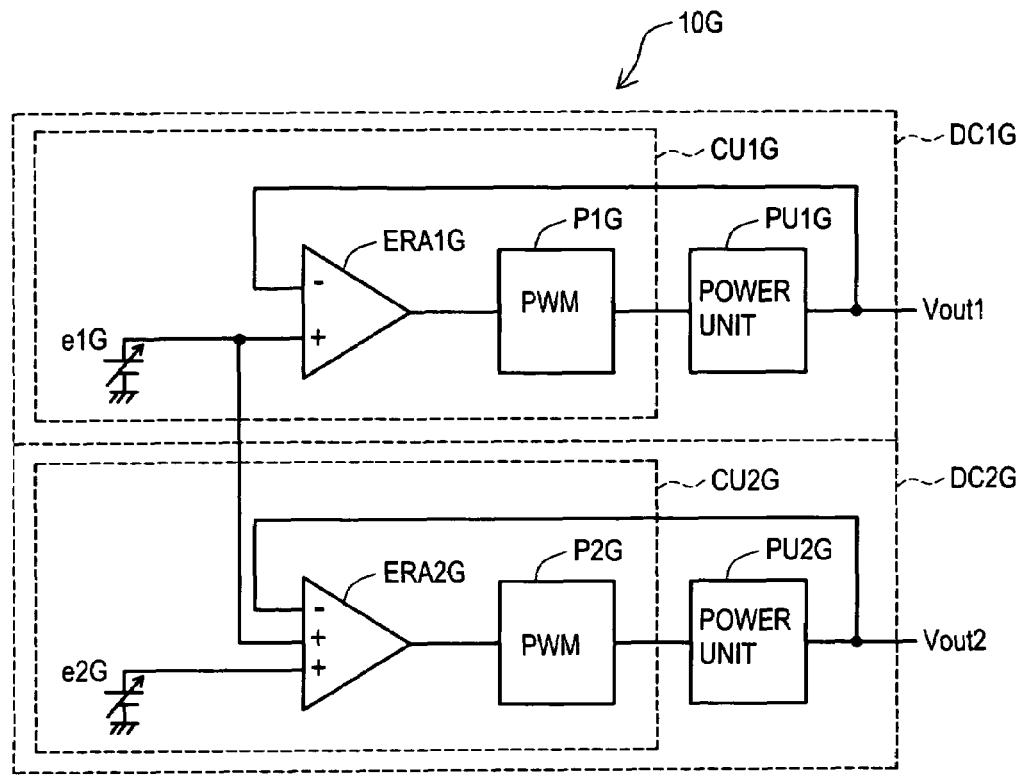
FIG. 1  PRINCIPLES OF PRESENT INVENTION (PART 1)

FIG. 2 PRINCIPLES OF PRESENT INVENTION (PART 2)
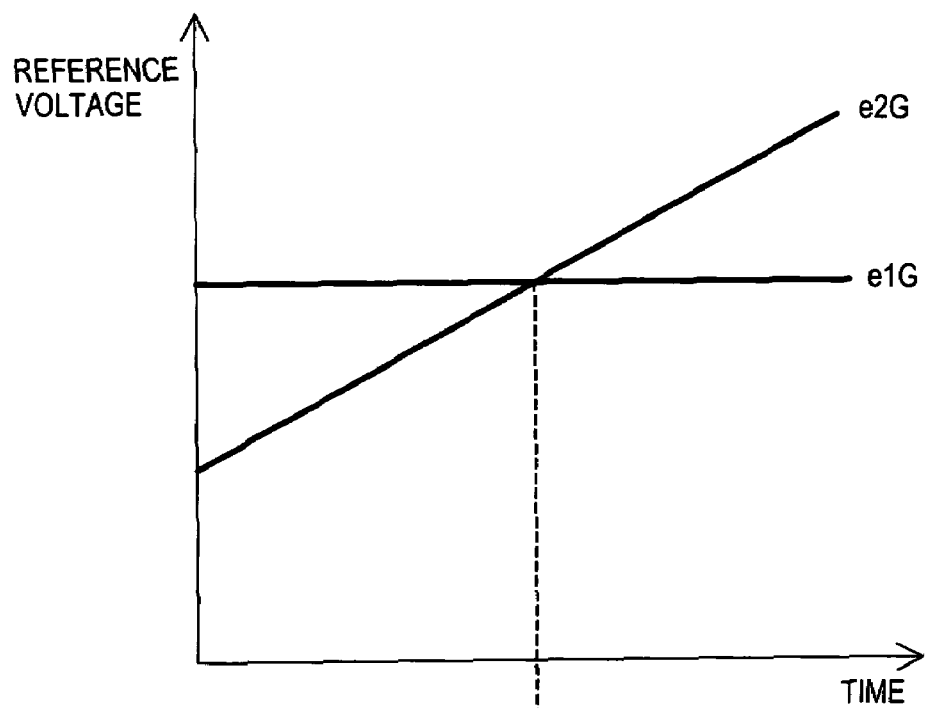
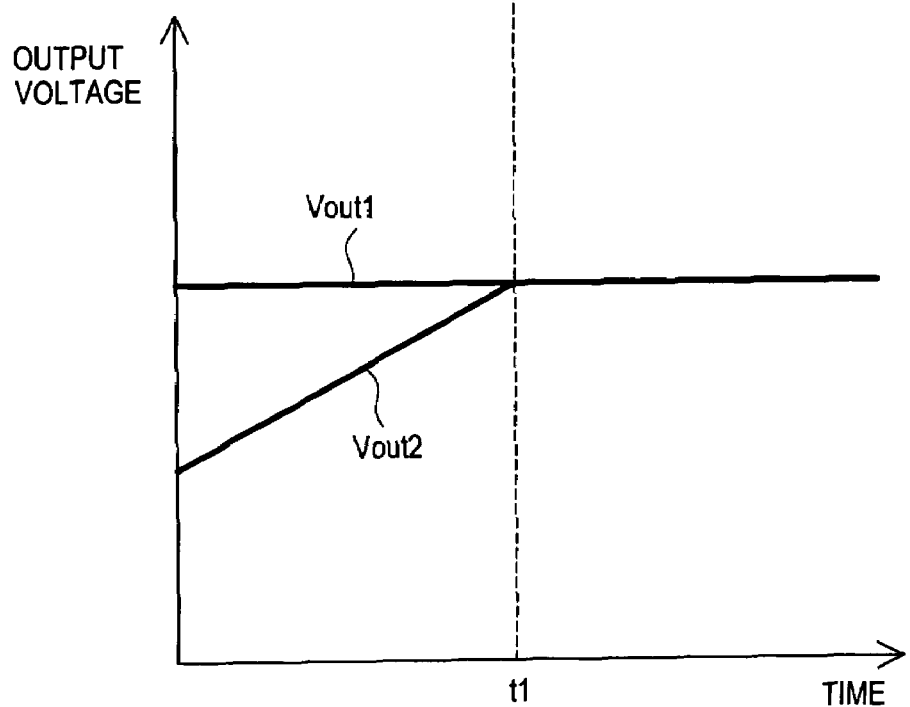

FIG. 3  PRINCIPLES OF PRESENT INVENTION (PART 3)
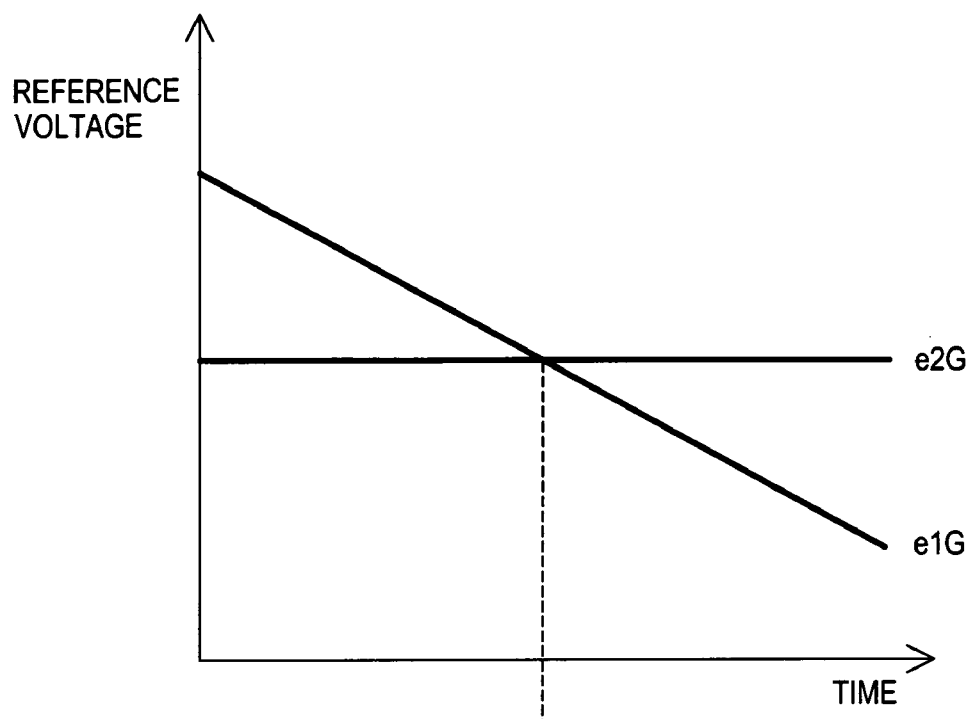
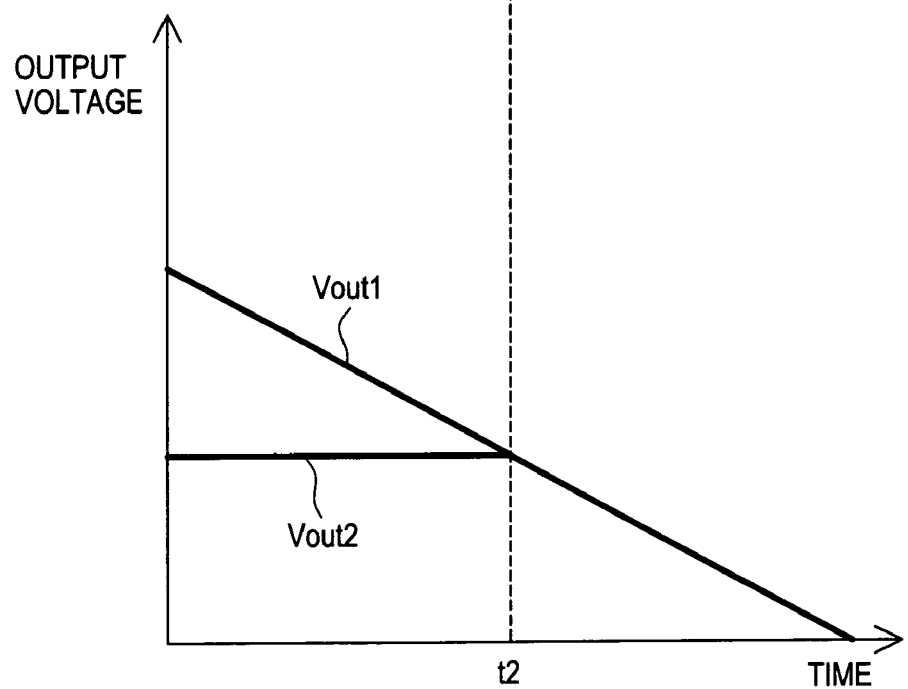

FIG. 4 PRINCIPLES OF PRESENT INVENTION (PART 4)
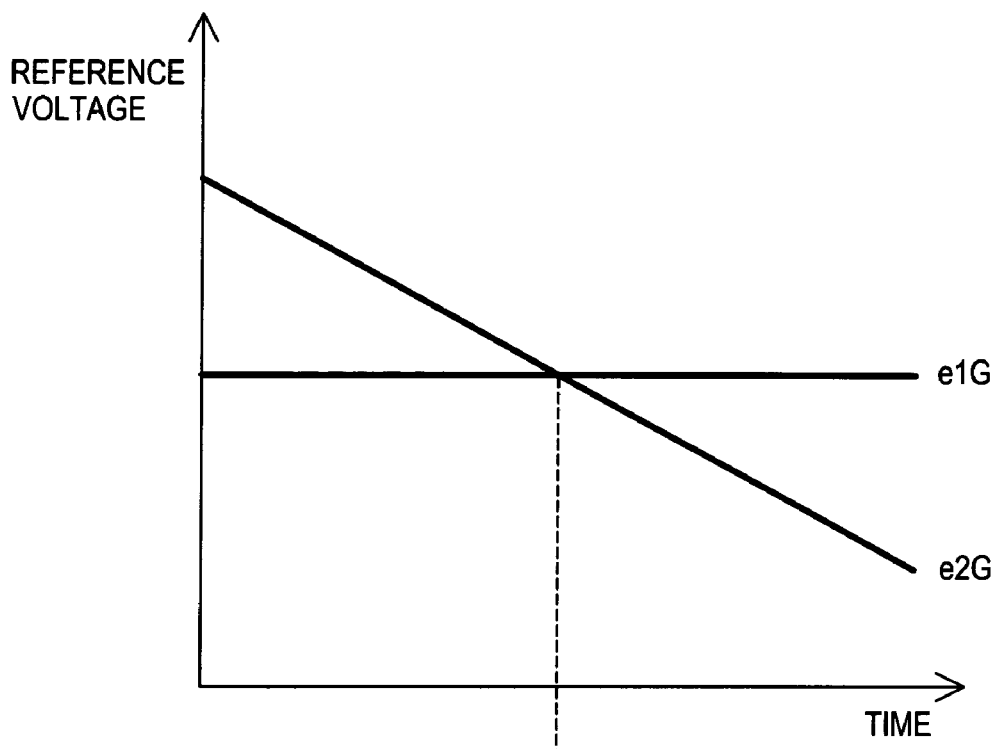
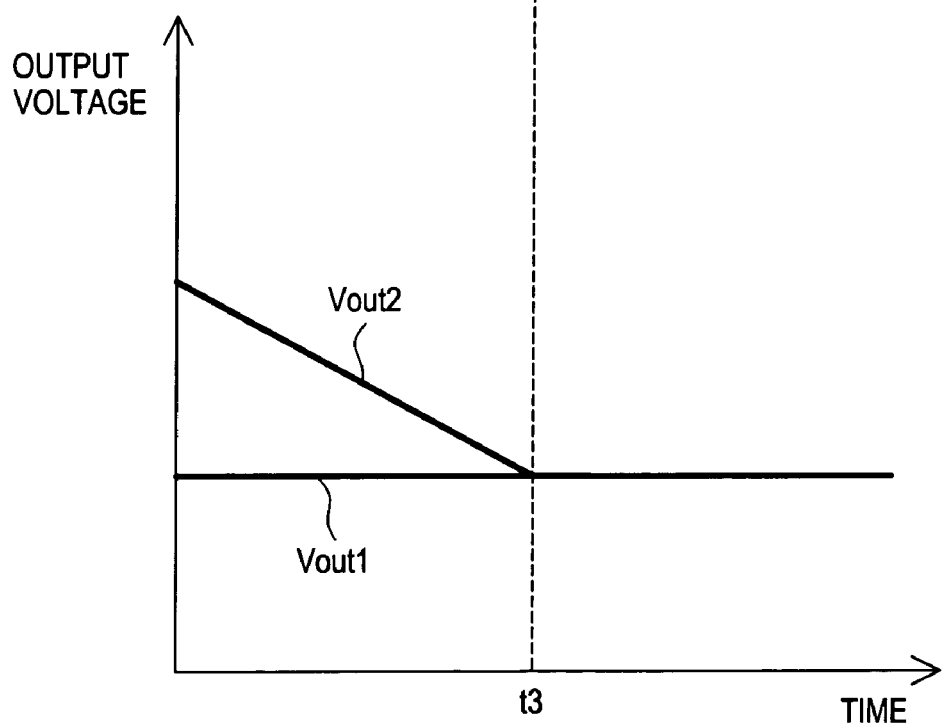

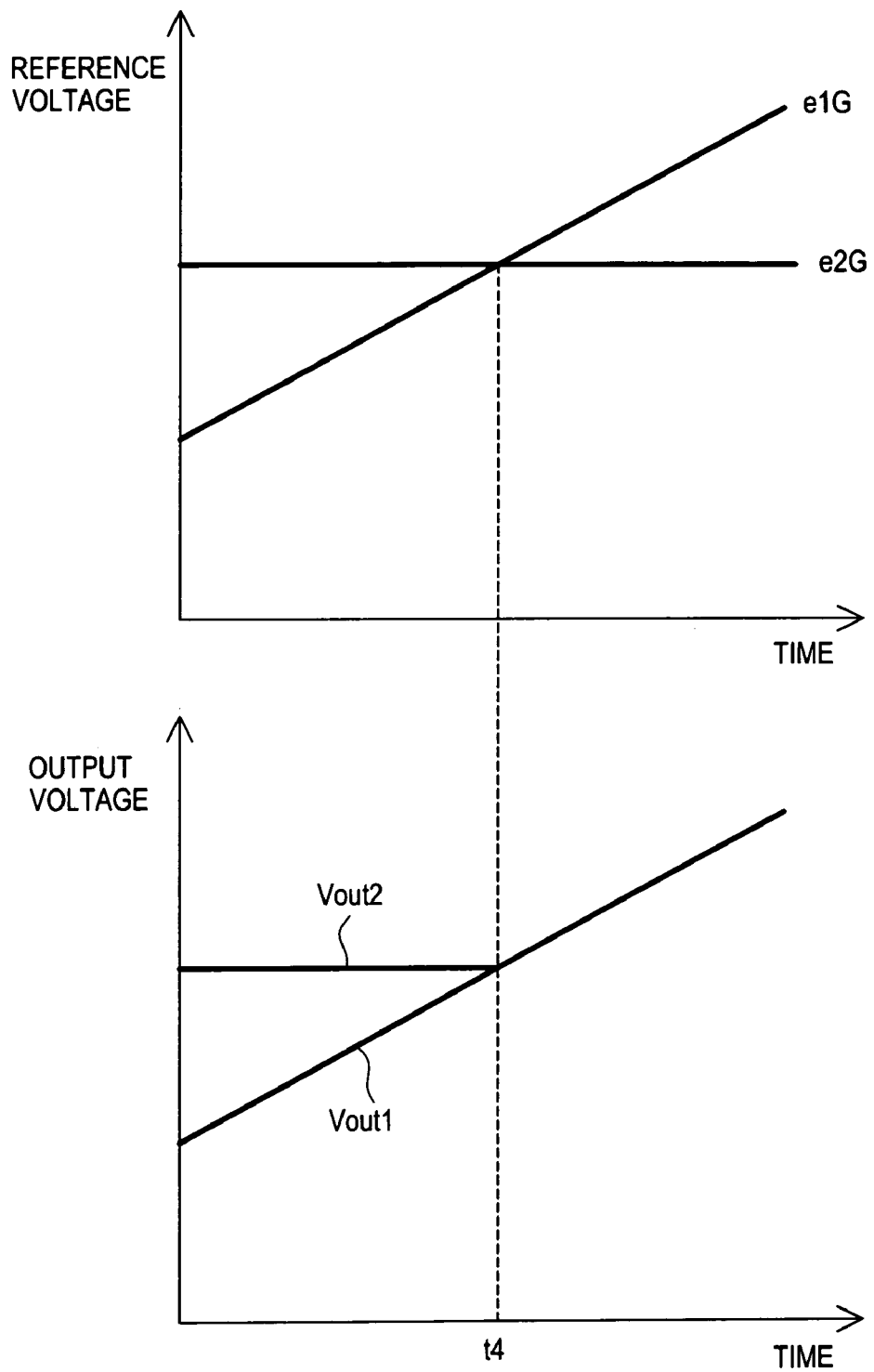
FIG. 5 PRINCIPLES OF PRESENT INVENTION (PART 5)

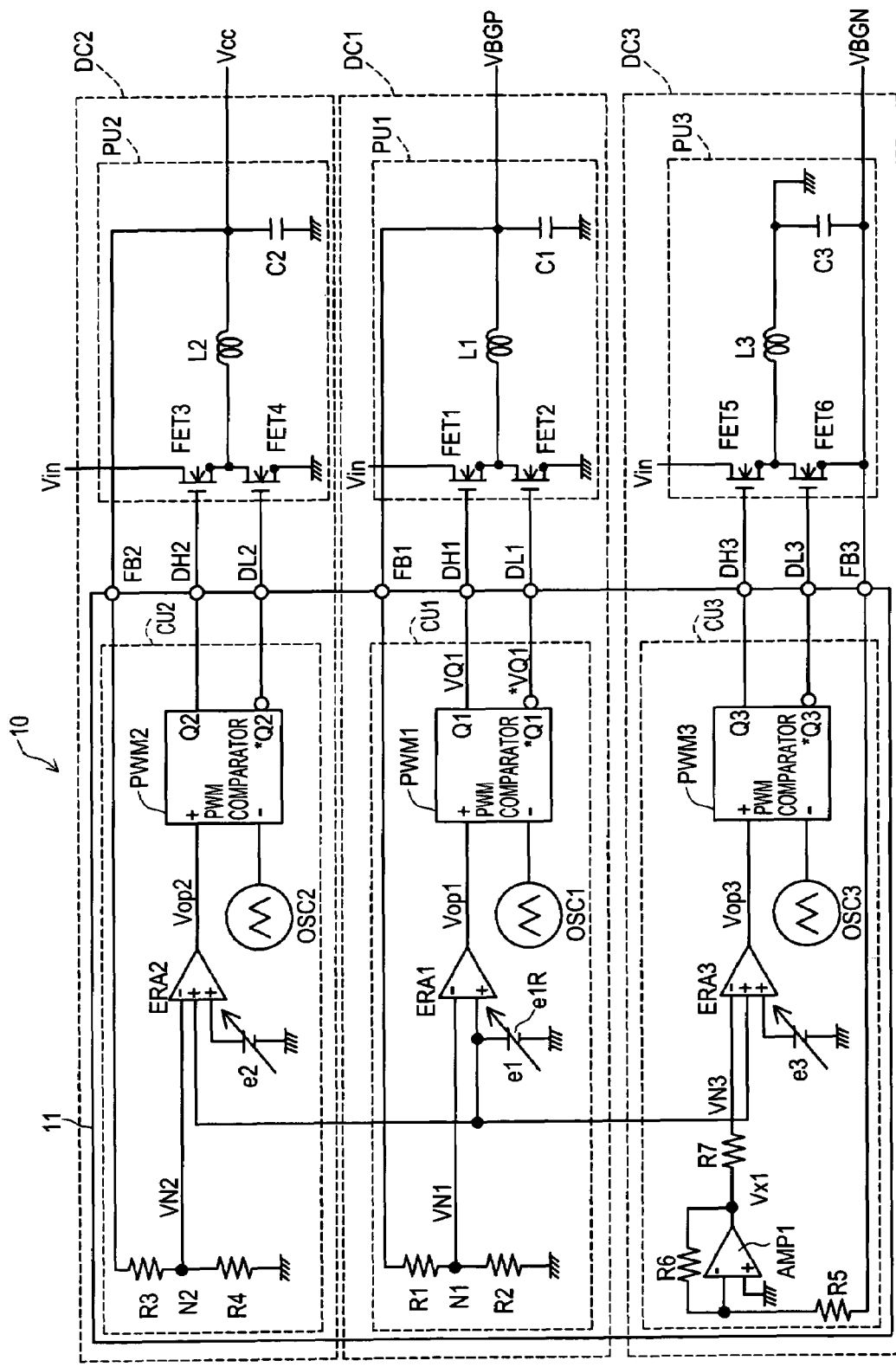
FIG. 6 CIRCUIT DIAGRAM OF POWER SUPPLY 10 OF FIRST EMBODIMENT

FIG. 7
GRAPH SHOWING CORRELATION BETWEEN REFERENCE VOLTAGE AND OUTPUT VOLTAGE IN POWER SUPPLY 10 (PART 1)
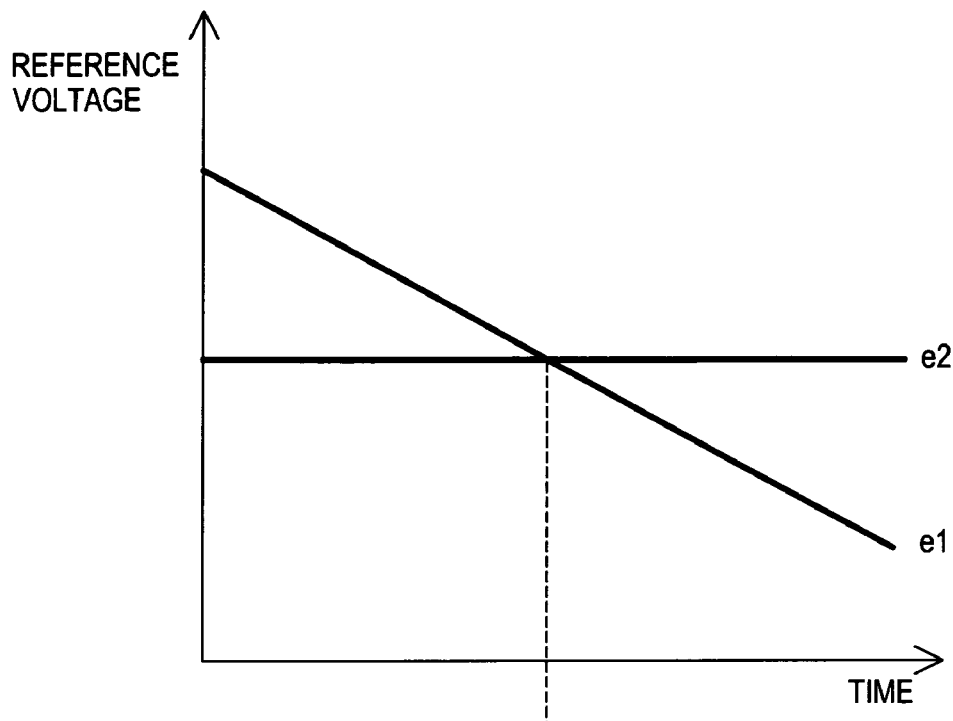
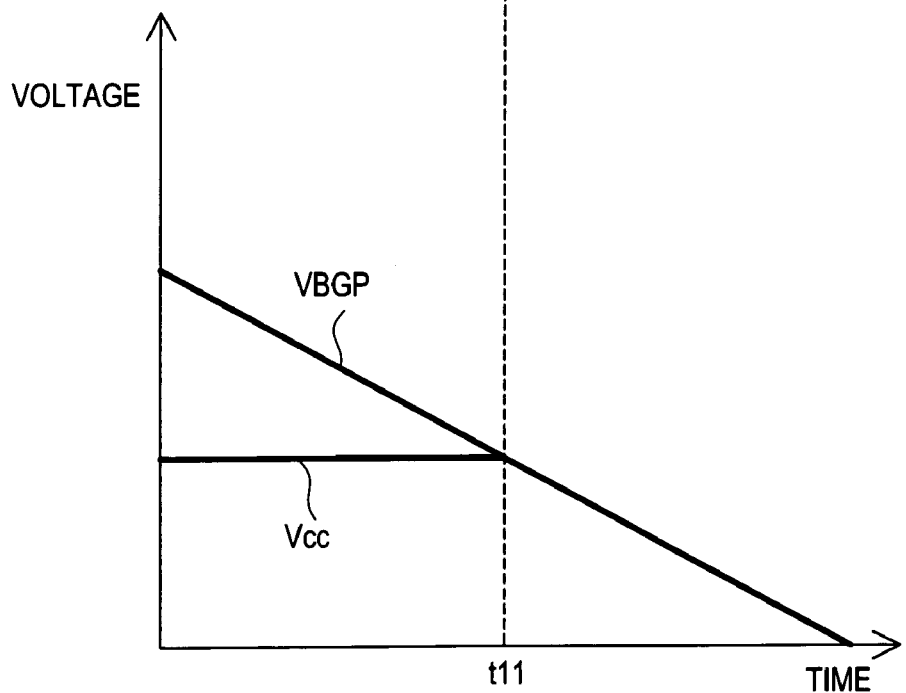

FIG. 8
GRAPH SHOWING CORRELATION BETWEEN REFERENCE VOLTAGE AND OUTPUT VOLTAGE IN POWER SUPPLY 10 (PART 2)
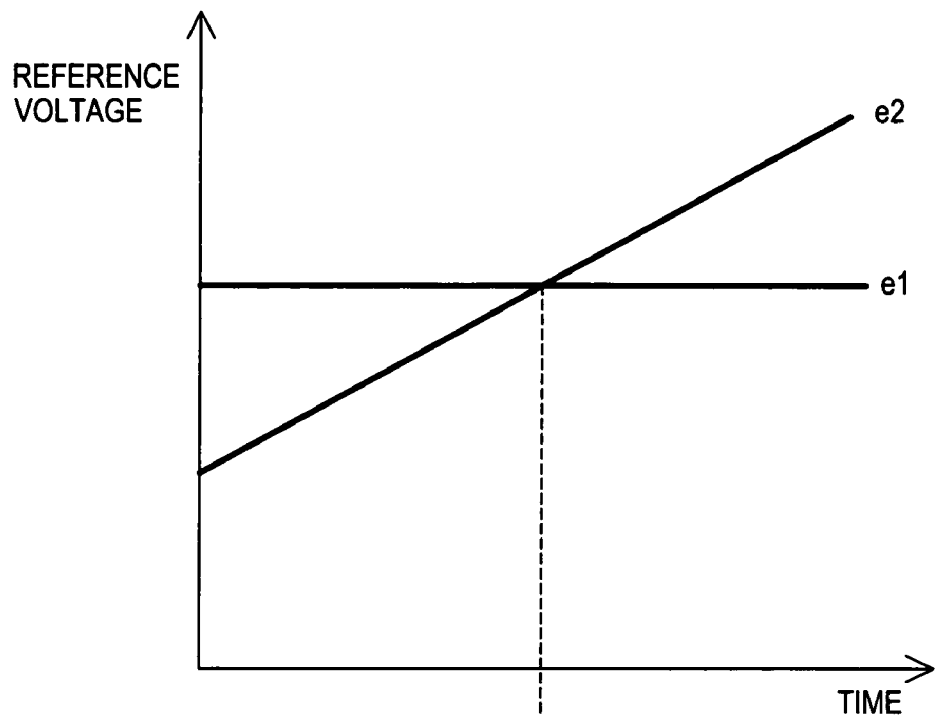
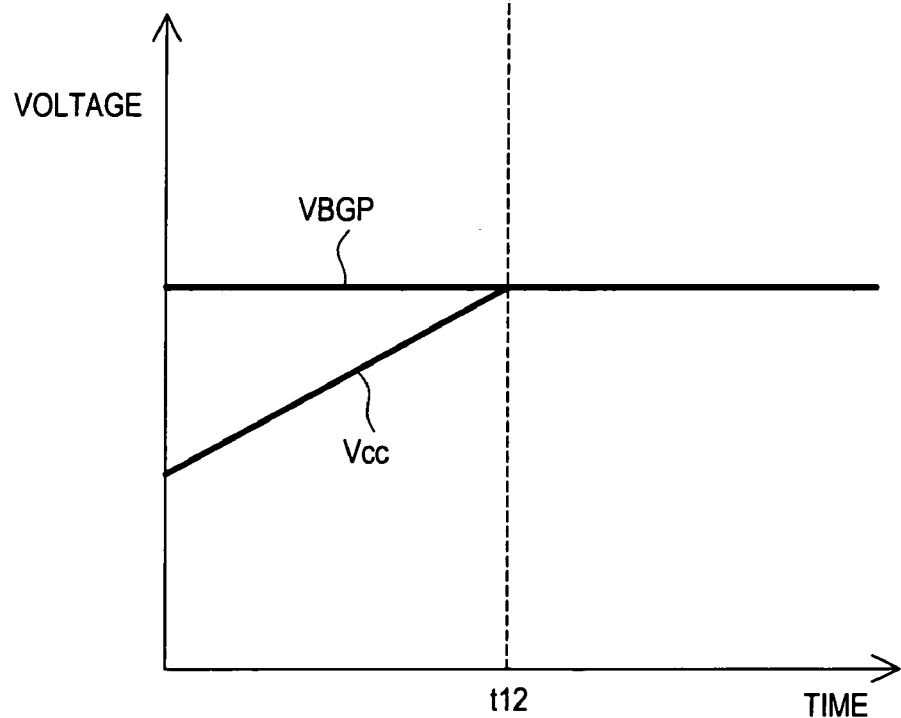

FIG. 9
GRAPH SHOWING CORRELATION BETWEEN REFERENCE VOLTAGE
AND OUTPUT VOLTAGE IN POWER SUPPLY 10 (PART 3)
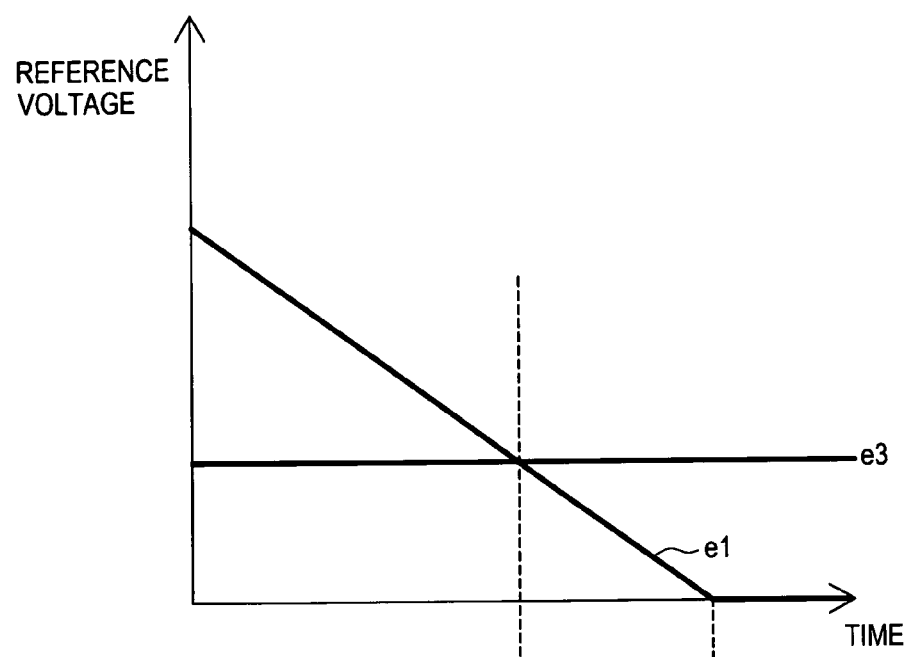
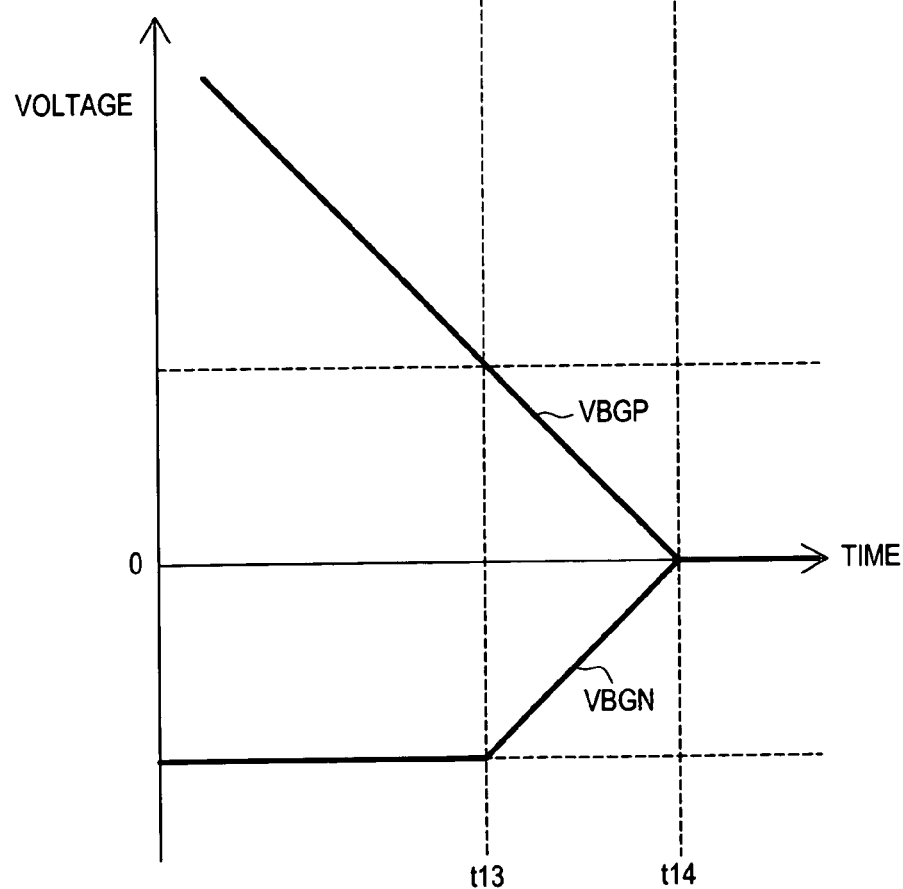

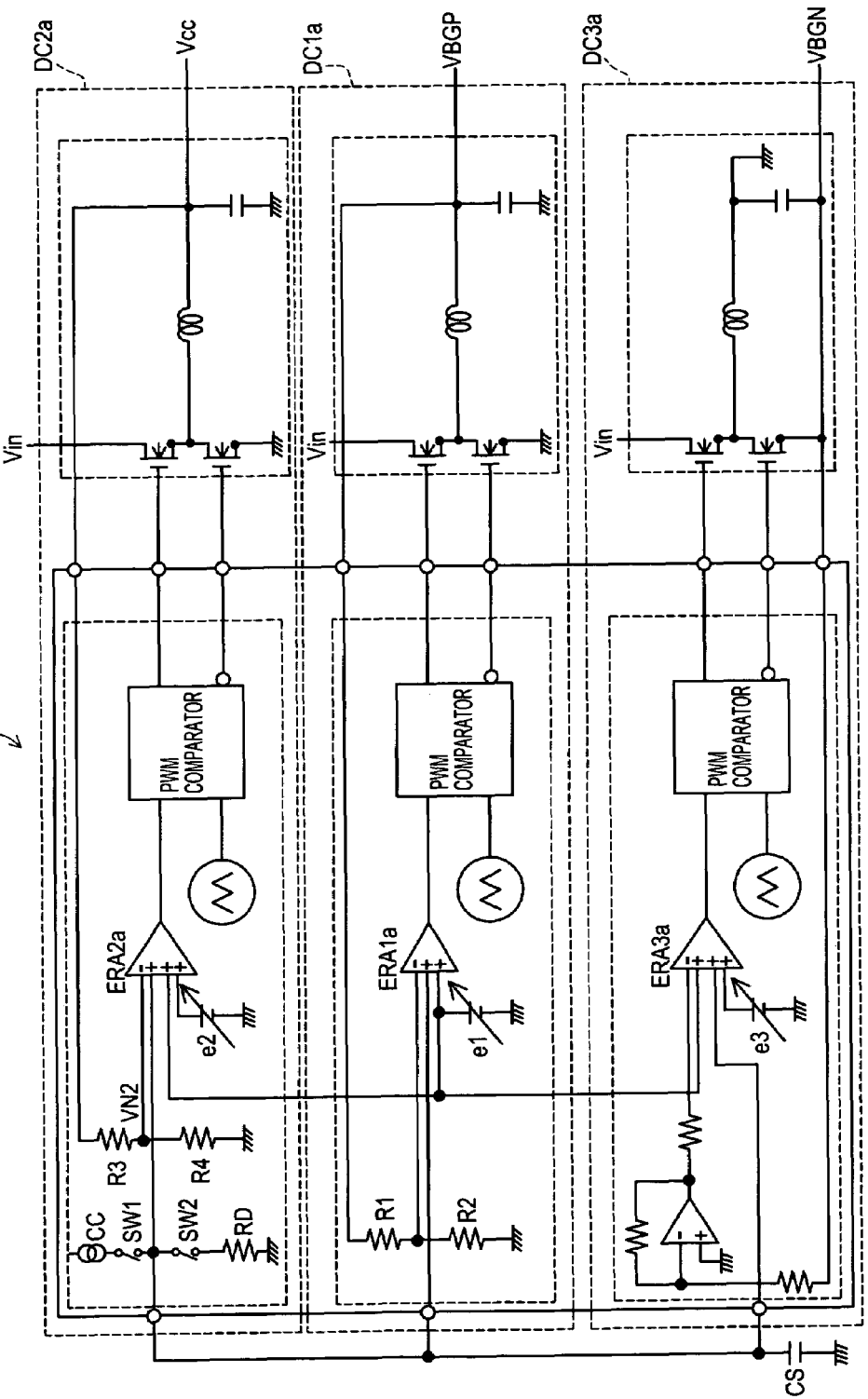
FIG. 10 CIRCUIT DIAGRAM OF POWER SUPPLY 10a OF SECOND EMBODIMENT

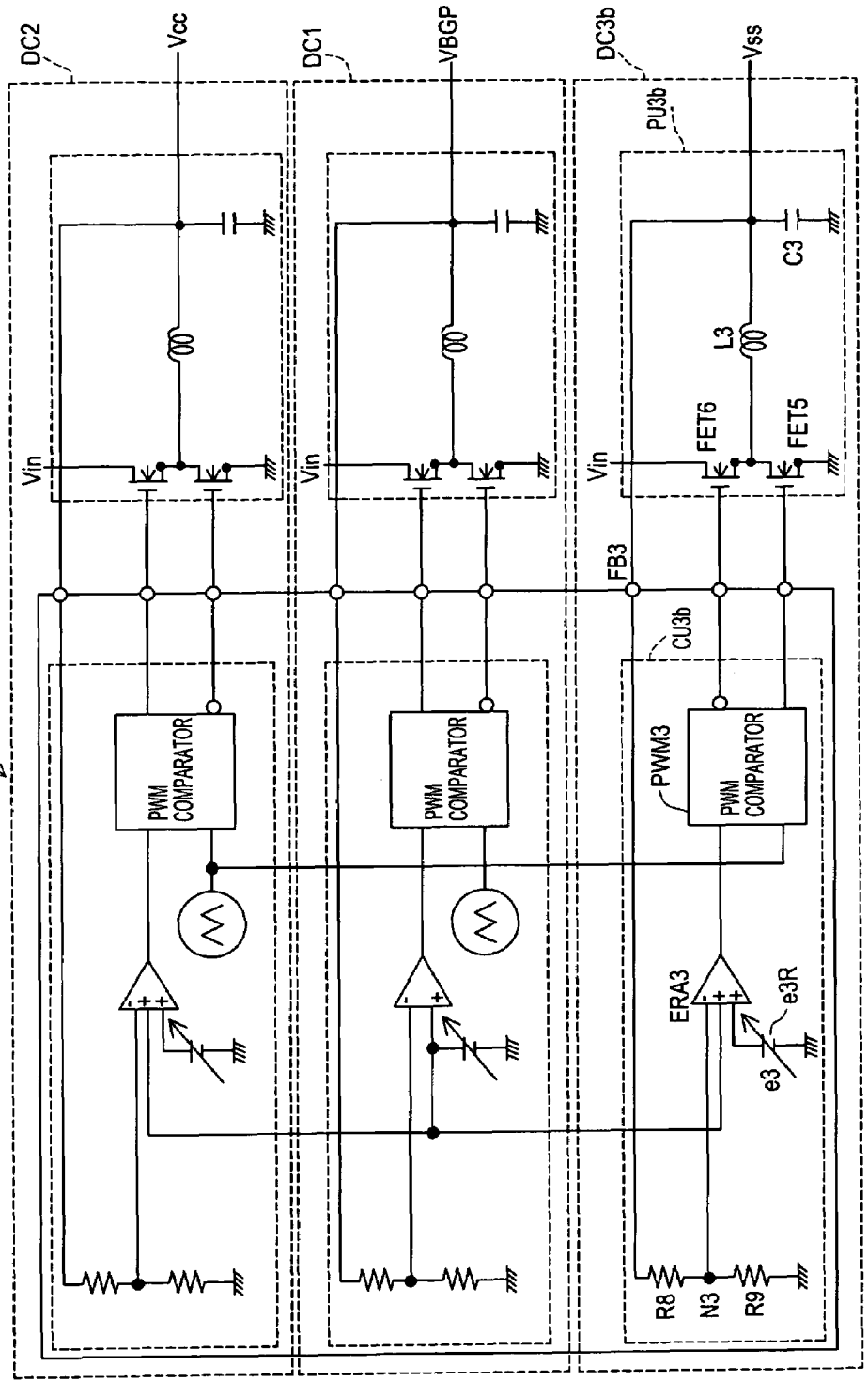
FIG. 11 CIRCUIT DIAGRAM OF POWER SUPPLY 10b

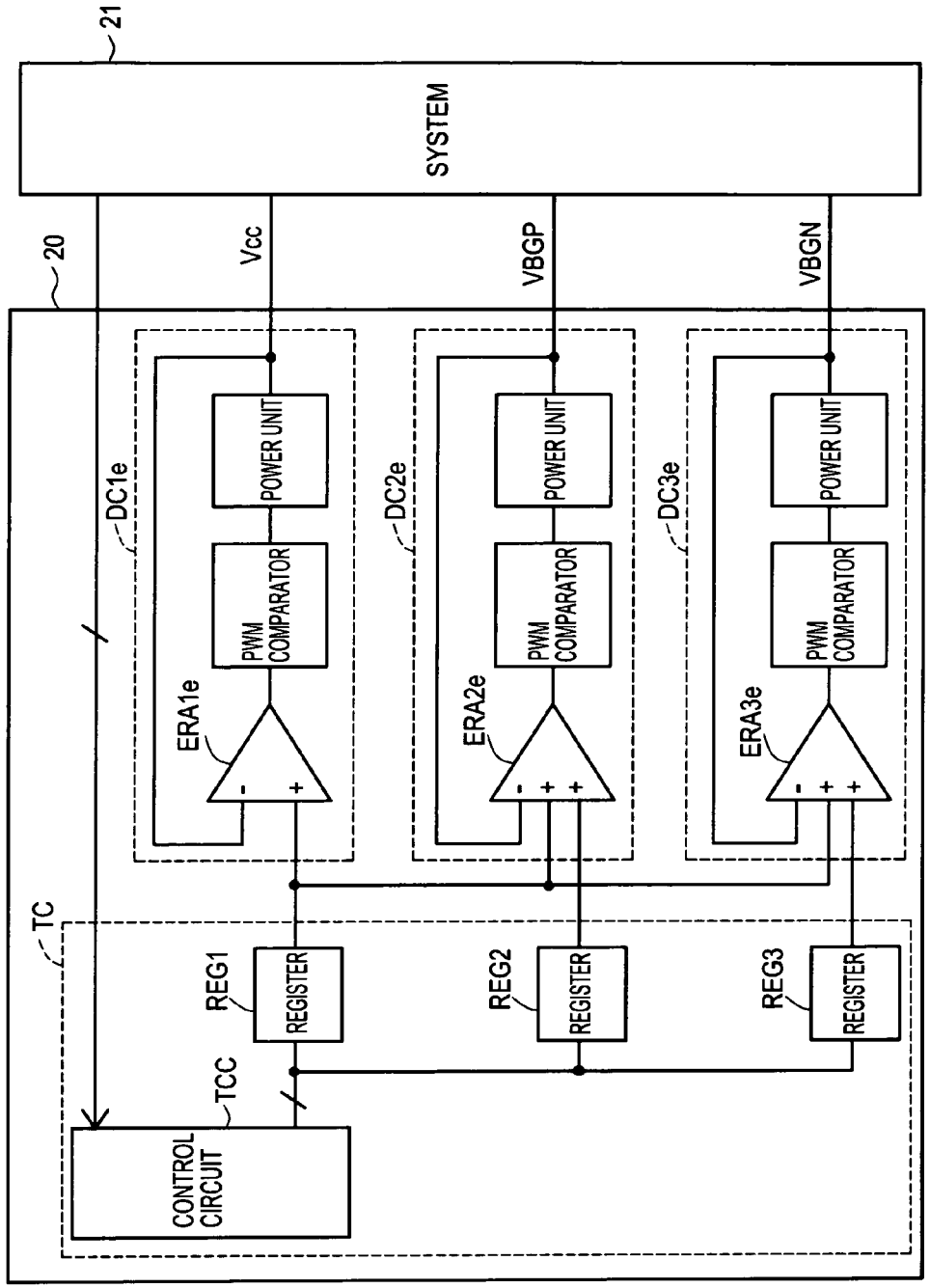
FIG. 12 CIRCUIT DIAGRAM SHOWING SYSTEM POWER SUPPLY 20 AND SYSTEM 21

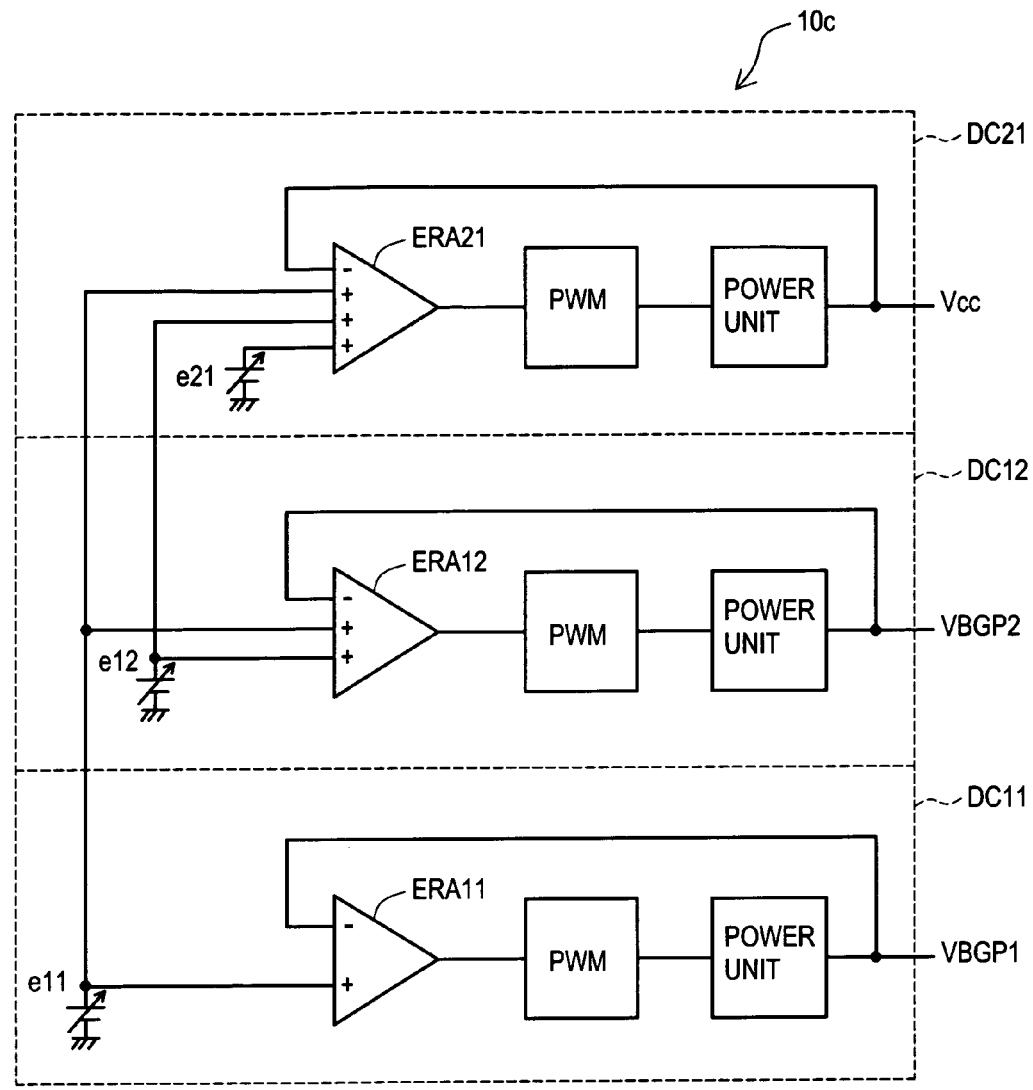
FIG. 13 CIRCUIT DIAGRAM OF POWER SUPPLY 10c

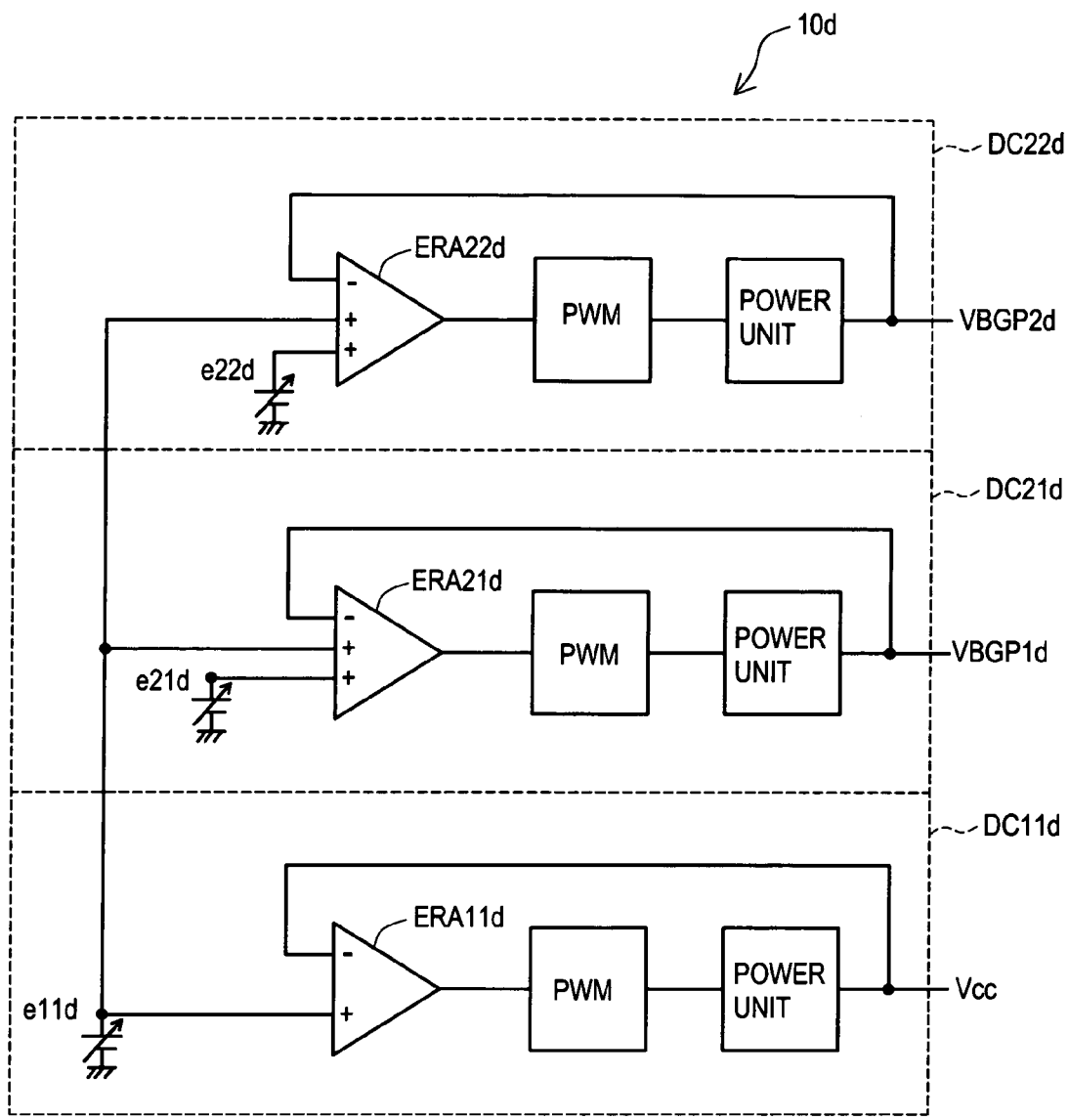
FIG. 14  CIRCUIT DIAGRAM OF POWER SUPPLY 10d

DC LINEAR REGULATOR SINGLE CONTROLLER WITH PLURAL LOADS

CROSS-REFERENCE TO RELATED APPLICATIONS

This application is based upon and claims the benefit of priority from each of the prior Japanese Patent Application No. 2006-045871 filed on Feb. 22, 2006, the entire contents of which are incorporated herein by reference.

BACKGROUND OF THE INVENTION

1. Field of the Invention

The present invention relates to a DC-DC converter control circuit, a DC-DC converter, and a DC-DC converter control method. More particularly, the present invention is concerned with a technology capable of maintaining a predetermined relationship of voltages established among a plurality of output voltages of DC-DC converters.

2. Description of the Related Art

In semiconductor circuits, a threshold voltage Vth of a transistor and various resistances vary along with a difference in a manufacturing process, a change in an operational ambient temperature, or a fluctuation of a supply voltage or the like. The operating velocity of a circuit varies depending on the variations. Consequently, the threshold voltage Vth and resistances are actively monitored in order to apply an appropriate supply voltage. Thus, the characteristics of a semiconductor circuit are held optimal all the time.

As related arts, Japanese Unexamined Patent Publications Nos. 2005-166698, H07(1995)-111314, and H07(1995)-176624 have been disclosed.

SUMMARY OF THE INVENTION

As mentioned above, when supply voltages of semiconductor circuits are dynamically controlled independently of each other, the voltages to be developed at power supplies should be determined carefully relative to each other. For example, when a supply voltage Vcc and a high-potential back-gate voltage VBGP are controlled independently of each other, the high-potential back-gate voltage VBGP may erroneously be set to a smaller value than the supply voltage Vcc is. This poses a problem in that a penetrating current increases to destroy a device.

Moreover, when a supply voltage of a semiconductor circuit is produced using mutually independent DC-DC converters, the output voltages of the DC-DC converters should have a predetermined relationship over a series of actions ranging from start of the DC-DC converters to stop thereof, or in other words, ranging from turning on of a power supply to turning off thereof. For example, when the DC-DC converter for a supply voltage Vcc is started, if the DC-DC converter for a high-potential back-gate voltage VBGP is kept switched off, since the high-potential back-gate voltage VBGP gets lower than the supply voltage Vcc, a penetrating current increases to destroy a device.

The present invention attempts to solve at least one of the problems underlying the background art. An object of the present invention is to provide a DC-DC converter control circuit, a DC-DC converter, and a DC-DC converter control method capable of maintaining a predetermined relationship of voltages established among output voltages of DC-DC converters even in a case where the plurality of output voltages of the DC-DC converters is controlled independently of one another.

To solve the above problem, there is provided a DC-DC converter control circuit for DC-DC converters that produce a plurality of mutually different output voltages, comprising: an output voltage control unit that receives a first signal which represents the actual value of a first output voltage out of the plurality of output voltages, and a second output voltage reference signal with which a target value of a second output voltage is instructed, and that controls the second output voltage according to the first signal or the second output voltage reference signal so that the second output voltage will maintain a predetermined relationship of potentials established relative to the first output voltage.

There is also provided a DC-DC converter that produces a plurality of mutually different output voltages, comprising: an output voltage control unit that receives a first signal which represents the actual value of a first output voltage out of the plurality of output voltages, and a second output voltage reference signal with which a target value of a second output voltage is instructed, and that controls the second output voltage according to the first signal and the second output voltage reference signal so that the second output voltage will maintain a predetermined relationship of potentials established relative to the first output voltage.

A DC-DC converter control circuit controls a plurality of DC-DC converters that produces different output voltages. The DC-DC converters produce a plurality of mutually different output voltages. A description will be made of a case where among the plurality of output voltages, a first output voltage and a second output voltage having a predetermined relationship of potentials established relative to the first output voltage will be focused. Herein, the predetermined relationship of potentials is, for example, a relationship signifying that the second output voltage is always lower than the first output voltage, a relationship signifying that the second output voltage is always higher than the first output voltage, or a relationship signifying that the second output voltage is set to 0 V when the first output voltage is 0 V. A first signal is a signal representing the current value of the first output voltage. A second output voltage reference signal is a signal with which a target value of the second output voltage is instructed. According to the first signal or second output voltage reference signal, an output voltage control unit controls the second output voltage so that the second output voltage will maintain the predetermined relationship of potentials established relative to the first output voltage. Incidentally, the number of first output voltages or second output voltages is not limited to a singular. Moreover, a certain output voltage may serve as the first output voltage in relation to one output voltage and serve as the second output voltage in relation to other output voltage.

To solve the above problem, there is also provided a DC-DC converter control method for producing a plurality of mutually different output voltages, wherein: a second output voltage is controlled based on a first signal which represents the actual value of a first output voltage out of the plurality of output voltages and a second output voltage reference signal, with which a target value of a second output voltage is instructed, so that the second output voltage will maintain a predetermined relationship of potentials established relative to the first output voltage.

A DC-DC converter control method is a method of controlling DC-DC converters that produce a plurality of mutually different output voltages. A first signal is a signal representing the actual value of a first output voltage. A second output voltage reference signal is a signal with which a target value of a second output voltage is instructed. According to the first signal or second output voltage reference signal, the second output voltage is controlled so that it will maintain a predetermined relationship of potentials established relative to the first output voltage.

Consequently, if the second output voltage has the predetermined relationship of voltages that it is always equal to or higher than the first output voltage, an output voltage control unit can control the second output voltage so that the second output voltage will remain equal to or higher than the first output voltage without fail. In contrast, if the second output voltage has the predetermined relationship of voltages that it is always equal to or lower than the first output voltage, the output voltage control unit can control the second output voltage so that the second output voltage will remain equal to or lower than the first output voltage without fail. Moreover, if the second output voltage has the predetermined relationship of voltages that it is set to 0 V when the first output voltage is 0 V, the output voltage control unit can control the second output voltage so that the second output voltage will maintain the relationship.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 shows the principles of the present invention (part 1);

FIG. 2 shows the principles of the present invention (part 2);

FIG. 3 shows the principles of the present invention (part 3);

FIG. 4 shows the principles of the present invention (part 4);

FIG. 5 shows the principles of the present invention (part 5);

FIG. 6 is a circuit diagram of a power supply 10 of the first embodiment;

FIG. 7 is a graph showing the correlation between a reference voltage and an output voltage in the power supply 10 (part 1);

FIG. 8 is a graph showing the correlation between the reference voltage and output voltage in the power supply 10 (part 2);

FIG. 9 is a graph showing the correlation between the reference voltage and output voltage in the power supply 10 (part 3);

FIG. 10 is a circuit diagram of a power supply 10a of the second embodiment;

FIG. 11 is a circuit diagram of a power supply 10b;

FIG. 12 is a circuit diagram showing a system power supply 20 and a system 21;

FIG. 13 is a circuit diagram of a power supply 10c; and

FIG. 14 is a circuit diagram of a power supply 10d.

DETAILED DESCRIPTION OF THE PREFERRED EMBODIMENTS

FIG. 1 to FIG. 5 show the principles of the present invention. A power supply 10G shown in FIG. 1 includes DC-DC converters DC1G and DC2G. The DC-DC converter DC1G is a circuit that produces a first output voltage Vout1, while the DC-DC converter DC2G is a circuit that produces a second output voltage Vout2.

The DC-DC converter DC1G includes a control unit CU1G and a power unit PU1G. The control unit CU1G includes a first differential-input amplifier ERA1G and a pulse-width modulator (PWM) P1G. The first output voltage Vout1 is applied to the inverting input terminal of the first differential-input amplifier ERA1G, while a first reference voltage e1G is applied to the non-inverting input terminal of the first differential-input amplifier ERA1G. The output terminal of the first differential-input amplifier ERA1G is connected to the input terminal of the PWM P1G. The output terminal of the PWM P1G is connected to the input terminal of the power unit PU1G.

Likewise, the DC-DC converter DC2G includes a control unit CU2G and a power unit PU2G. The control unit CU2G includes a second differential-input amplifier ERA2G and a pulse-width modulator (PWM) P2G. The second output voltage Vout 2 is applied to the inverting input terminal of the second differential-input amplifier ERA2G. A second reference voltage e2G at a ground is applied to a first non-inverting input terminal of the second differential-input amplifier ERA2G, and the first reference voltage e1G for the DC-DC converter DC1G is applied to the second non-inverting input terminal thereof. The second differential-input amplifier ERA2G may enter a mode in which it amplifies the difference between a higher one of the voltages applied to the non-inverting input terminals thereof and the voltage applied to the inverting input terminal thereof, or a mode in which it amplifies the difference between a lower one of the voltages applied to the non-inverting input terminals thereof and the voltage applied to the inverting input terminal thereof. Whichever of the modes the second differential-input amplifier enters depends on the relationship of voltages established between the second output voltage Vout 2 and the first output voltage Vout1. The other components of the DC-DC converter DC2G are identical to those of the DC-DC converter DC1G. An iterative description will be omitted.

The output voltages to be produced based on the first reference voltage e1G and second reference voltage e2G respectively are controlled to be varied independently of each other. For example, a method of varying or controlling the reference voltage includes a method of switching a plurality of reference voltages. The first output voltage Vout1 is produced based on the first reference voltage e1G, and the second output voltage Vout2 is produced based on the second reference voltage e2G and first reference voltage e1G.

A case where when the predetermined relationship of voltages that the second output voltage Vout2 is always equal to or lower than the first output voltage Vout1 is established in advance, the first reference voltage e1G to be used to control the first output voltage Vout1 and the second reference voltage e2G to be used to control the second output voltage Vout2 are dynamically varied independently of each other will be described in conjunction with FIG. 2 and FIG. 3. In this case, the second differential-input amplifier ERA2G amplifies the difference between a lower one of the first reference voltage e1G and second reference voltage e2G and the second output voltage Vout2.

When the power supply 10G is steady-state, the second reference voltage e2G is lower than the first reference voltage e1G. At this time, the second differential-input amplifier ERA2G amplifies the difference between the second reference voltage e2G and second output voltage Vout2. A description will be made of a case where as shown in FIG. 2, the second reference voltage e2G is stepped up to get higher than the first reference voltage e1G at a time instant t1. After the time instant t1, the second differential-input amplifier ERA2G amplifies the difference between the first reference voltage e1G and second output voltage Vout2 instead of the difference between the second reference voltage e2G and second output voltage Vout2. Since the second output voltage Vout2 is controlled with the first reference voltage e1G, even if the second reference voltage e2G gets higher than the first reference voltage e1G, the second output voltage Vout2 is clamped with the first output voltage Vout1.

A description will be made of a case where, as shown in FIG. 3, the first reference voltage e1G is stepped down to get lower than the second reference voltage e2G at a time instant t2. After the time instant t2, the second differential-input amplifier ERA2G amplifies the difference between the first reference voltage e1G and second output voltage Vout2 instead of the difference between the second reference voltage e2G and second output voltage Vout2. Consequently, since the second output voltage Vout2 is controlled with the first reference voltage e1G, the second output voltage Vout2 drops along with the first output voltage Vout1.

A case where when the predetermined relationship of voltages that the second output voltage Vout2 is always equal to or higher than the first output voltage Vout1 is established in advance, the first reference voltage e1G and second reference voltage e2G are dynamically varied independently of each other will be described in conjunction with FIG. 4 and FIG. 5. In this case, the second differential-input amplifier ERA2G amplifies the difference between a higher one of the first reference voltage e1G and second reference voltage e2G and the second output voltage Vout2.

When the power supply 10G is steady-state, the second reference voltage e2G is higher than the first reference voltage e1G. At this time, the second differential-input amplifier ERA2G amplifies the difference between the second reference voltage e2G and second output voltage Vout2. A description will be made of a case where, as shown in FIG. 4, the second reference voltage e2G is stepped down to get lower than the first reference voltage e1G at a time instant t3. After the time instant t3, the second differential-input amplifier ERA2G amplifies the difference between the first reference voltage e1G and second output voltage Vout2 instead of the difference between the second reference voltage e2G and second output voltage Vout2. Consequently, since the second output voltage Vout2 is controlled with the first reference voltage e1G, even if the second reference voltage e2G gets lower than the first reference voltage e1G, the second output voltage Vout2 is clamped with the first output voltage Vout1.

A description will be made of a case where, as shown in FIG. 5, the first reference voltage e1G is stepped up to get higher than the second reference voltage e2G at a time instant t4. After the time instant t4, the second differential-input amplifier ERA2G amplifies the difference between the first reference voltage e1G and second output voltage Vout2 instead of the difference between the second reference voltage e2G and second output voltage Vout2. Consequently, since the second output voltage Vout2 is controlled with the first reference voltage e1G, the second output voltage Vout2 rises along with the first output voltage Vout1.

Assuming that the predetermined relationship that the second output voltage is always equal to or higher than the first output voltage is established in advance, when the first reference voltage with which the first output voltage is controlled and the second reference voltage with which the second output voltage is controlled are dynamically varied independently of each other, even if the second reference voltage gets lower than the first reference voltage due to an error or a failing, the second output voltage can be held equal to or higher than the first output voltage without fail. In contrast, assuming that the predetermined relationship of voltages that the second output voltage is always equal to or lower than the first output voltage, when the first reference voltage and second reference voltage are dynamically varied independently of each other, even if the second reference voltage gets higher than the first reference voltage due to an error or a failing, the second output voltage can be held equal to or lower than the first output voltage without fail. Namely, a fail-safe effect can be exerted against the dynamic varying of the first and second reference voltages.

The first embodiment of the present invention will be described in conjunction with FIG. 6 to FIG. 9. FIG. 6 shows a power supply 10 of the first embodiment. The power supply 10 includes DC-DC converters DC1 to DC3. The DC-DC converters DC1 to DC3 are controlled by a common DC-DC converter control circuit 11. The DC-DC converter DC1 is a circuit that produces a high-potential back-gate voltage VBGP that is a back-gate voltage to be applied to a PMOS transistor included in a semiconductor device that is not shown. The DC-DC converter DC2 is a circuit that produces a supply voltage Vcc of the semiconductor device. The DC-DC converter DC3 is a circuit that produces a low-potential back-gate voltage VBGN that is a voltage to be applied to the back gate of an n-type MOSFET included in the semiconductor device.

The DC-DC converter DC1 includes a control unit CU1 and a power unit PU1, and produces the high-potential back-gate voltage VBGP. In the power unit PU1, an input voltage Vin is applied to the input terminal of a transistor FET1 that serves as a main switching element. The input terminal of a choke coil L1 is connected to the output terminal of the transistor FET1. The output terminal of the choke coil L1 is connected to the output terminal VBGP of the DC-DC converter DC1. The output terminal DH1 of the DC-DC converter control circuit 11 is connected to the control terminal of the transistor FET1. The input terminal of a transistor FET2 serving as a synchronous rectifier switching element is grounded, and the output terminal thereof is connected to the input terminal of the choke coil L1. The output terminal DL1 of the DC-DC converter control circuit 11 is connected to the control terminal of the transistor FET2. A smoothing capacitor C1 is connected between the output terminal VBGP of the DC-DC converter DC1 and a ground. The output terminal VBGP is connected to the input terminal FB1 of the DC-DC converter control circuit 11.

The control unit CU1 includes a differential-input amplifier ERA1, a pulse-width modulator (PWM) comparator PWM1, a triangle-wave oscillator OSC1, a reference voltage production circuit e1R, an input resistor R1, and a ground resistor R2. The input resistor R1 and ground resistor R2 are connected between the input terminal FB1 of the control circuit 11 and the ground via a node N1. The node N1 is connected to the inverting input terminal of the differential-input amplifier ERA1. Moreover, a reference voltage e1 produced by the reference voltage production circuit e1R is applied to the non-inverting input terminal of the differential-input amplifier ERA1. An output voltage Vop1 produced by the differential-input amplifier ERA1 is applied to the non-inverting input terminal of the PWM comparator PWM1. An output signal of the triangle-wave oscillator OSC1 is applied to the inverting input terminal of the PWM comparator PWM1. An output signal VQ1 fed via the non-inverting output terminal Q1 of the PWM comparator PWM1 is applied to the output terminal DH1. A signal *VQ1 fed via the inverting output terminal *Q1 is applied to the output terminal DL1.

Likewise, the DC-DC converter DC2 includes a control unit CU2 and a power unit PU2, and produces the supply voltage Vcc. The control unit CU2 includes a differential-input amplifier ERA2. The supply voltage Vcc produced by the DC-DC converter 2 connected to the RB2 terminal of the control unit is applied to the inverting input terminal of the differential-input amplifier ERA2 after having a fraction thereof obtained by the circuit composed of the input resistor R3 and ground resistor R4 connected in series with each other between the FB2 terminal and the ground. A reference voltage e2 developed at the ground is applied to the first non-inverting input terminal of the differential-input amplifier ERA2, and a reference voltage e1 for the DC-DC converter 1 is applied to the second non-inverting input terminal of the differential-input amplifier ERA2. An output voltage Vop2 produced by the differential-input amplifier ERA2 is applied to the non-inverting input of the PWM comparator PWM2. Moreover, a fraction determined by the input resistor R3 and ground resistor R4 is equal to a fraction determined by the input resistor R1 and ground resistor R2. The relationship of values between the high-potential back-gate voltage VBGP and supply voltage Vcc is identical to the one between the reference voltages e1 and e2. Consequently, the relationship between the high-potential back-gate voltage VBGP and supply voltage Vcc can be controlled by controlling the relationship between the reference voltages e1 and e2. The other components are identical to those of the DC-DC converter DC1. An iterative description will be omitted.

Likewise, the DC-DC converter DC3 includes a control unit CU3 and a power unit PU3, and produces a low-potential back-gate voltage VBGN. The low-potential back-gate voltage VBGN is a voltage to be applied to the back gate of an NMOS transistor and is a negative voltage.

In the power unit PU3, an input voltage Vin is applied to the input terminal of a transistor FET5 serving as a main switching element. The input terminal of a choke coil L3 is connected to the output terminal of the transistor FET5, and the output terminal of the choke coil L3 is grounded. The output terminal DH3 of the DC-DC converter control circuit 11 is connected to the control terminal of the transistor FET5. The input terminal of a transistor FET6 is connected to the output terminal VBGN of the DC-DC converter 3, and the output terminal thereof is connected to the input terminal of the choke coil L3. The control terminal of the transistor FET6 is connected to the output terminal DL3 of the DC-DC converter control circuit 11. A smoothing capacitor C3 is connected between the output terminal VBGN of the DC-DC converter DC3 and the ground. The input terminal FB3 of the DC-DC converter control circuit 11 is connected to the output terminal VBGN.

In the control unit CU3, the low-potential back-gate voltage VBGN is applied to the inverting input terminal of a voltage amplifier AMP1 via an input resistor R5. The non-inverting input terminal of the voltage amplifier AMP1 is grounded. A feedback resistor R6 is connected between the inverting input terminal and output terminal of the voltage amplifier AMP1. The output terminal of the voltage amplifier AMP1 is connected to the inverting input terminal of a differential-input amplifier ERA3 via an input resistor R7. A reference voltage e3 developed at the ground is applied to the first non-inverting input terminal of the differential-input amplifier ERA3, and a reference voltage e1 for the DC-DC converter 1 is applied to the second non-inverting input terminal of the differential-input amplifier ERA3. An output voltage Vop3 produced by the differential-input amplifier ERA3 is applied to the non-inverting input terminal of the PWM comparator PWM3. Moreover, since the resistance of the input resistor R5 and the resistance of the feedback resistor R6 are equal to each other, the output voltage Vx1 of the voltage amplifier AMP1 is a positive voltage whose value is equal to the absolute value of the low-potential back-gate voltage VBGN. The other components are identical to those of the DC-DC converter DC1. An iterative description will be omitted.

Actions to be performed in the DC-DC converter DC1 will be described below. The output voltage VGBP of the DC-DC converter DC1 to be applied to the input terminal FB1 of the DC-DC converter control circuit 11 has a fraction thereof obtained by the circuit composed of the input resistor R1 and ground resistor R2. The fraction of the output voltage is applied as a fractional voltage VN1 to the inverting input terminal of the differential-input amplifier ERA1. The differential-input amplifier ERA1 amplifies the difference between the high-potential back-gate voltage VBGP and reference voltage e1, and provides the resultant voltage as an output voltage Vop1. When the high-potential gate-voltage voltage VBGP drops to have a large difference from the reference voltage e1, the output voltage Vop1 rises. On the other hand, when the high-potential back-gate voltage VBGP rises to have a little difference from the reference voltage e1, the output voltage Vop1 drops.

The PWM comparator PWM1 compares the output voltage Vop1 with the output voltage of the triangle-wave oscillator OSC1. When the output voltage Vop1 is higher than the output voltage of the triangle-wave oscillator OSC1, the PWM comparator PWM1 produces a high-level output signal VQ1. The PWM comparator PWM1 acts as an output voltage pulse-width modulator that produces a pulse whose pulse duration is proportional to the value of the output voltage Vop1. While the output signal VQ1 remains high, the transistor FET1 is conducting and the transistor FET2 is non-conducting. On the other hand, while the output signal VQ1 remains low, the transistor FET1 is non-conducting and transistor FET2 is conducting.

When the transistor FET1 becomes conducting, a current is induced by the input voltage Vin and fed to a load via the choke coil L1. Consequently, energy is accumulated in the choke coil L1. Thereafter, when the transistor FET1 becomes non-conducting, the transistor FET2 becomes conducting and the energy accumulated in the choke coil L1 is released. At this time, the high-potential back-gate voltage VBGP is expressed as follows:

$$VBGP = Ton/(Ton+Toff) \times Vin = Ton/T \times Vin \qquad (1)$$

In the DC-DC converter DC1, the control of the high-potential back-gate voltage VBGP is achieved when the differential-input amplifier ERA1 amplifies the difference between the fractional voltage VN1 and reference voltage e1. When the reference voltage e1 is controlled to be varied, the duty cycle of the transistor FET1 is controlled. Thus, the value of the high-potential back-gate voltage VBGP can be controlled to be varied. The control of the reference voltage e1 is achieved by a control circuit, which is not shown, according to a difference in a manufacturing process of a semiconductor device that is a destination of the high-voltage back-gate voltage VBGP or a change in an operational ambient temperature. Needless to say, the high-potential back-gate voltage VBGP can be controlled to be varied by changing the resistance of the ground resistor R2 so as to differentiate the fraction.

Next, actions to be performed in the DC-DC converter DC2 will be described below. The supply voltage Vcc produced by the DC-DC converter DC2 and applied to the input terminal FB2 of the DC-DC converter control circuit 11 has a fraction thereof obtained by the circuit composed of the input resistor R3 and ground resistor R4. The fraction of the supply voltage is applied as a fractional voltage VN2 to the inverting input terminal of the differential-input amplifier ERA2. The differential-input amplifier ERA2 is an amplifier that amplifies the difference between a lower one of the reference voltages e1 and e2 applied to the two non-inverting input terminals respectively thereof and the fractional voltage VN2 applied to the inverting input terminal thereof. Consequently, when the reference voltage e2 is lower than the reference voltage e1, the differential-input amplifier ERA2 amplifies the difference between the fractional voltage VN2 applied to the inverting input terminal thereof and the reference voltage e2. When the reference voltage e2 is higher than the reference voltage e1, the differential-input amplifier ERA2 amplifies the difference between the fractional voltage VN2 applied to the inverting input terminal thereof and the reference voltage e1. The other actions are identical to those performed in the DC-DC converter DC1. An iterative description will be omitted.

In the DC-DC converter DC2, the control of the supply voltage Vcc is achieved by varying or controlling the reference voltage e2. When the reference voltage e2 is stepped up, the supply voltage Vcc rises. When the reference voltage e2 is stepped down, the supply voltage Vcc drops. At this time, if the high-potential back-gate voltage VBGP fed from the DC-DC converter DC1 and the supply voltage Vcc fed from the DC-DC converter DC2 are dynamically regulated independently of each other without a fail-safe mechanism, the supply voltage Vcc gets higher than the high-potential back-gate voltage VBGP. This brings about the fear that in a PMOS transistor to which the supply voltage Vcc and high-potential back-gate voltage VBGP are fed, a penetrating current increases to destroy the device. Therefore, the relative values of the high-potential back-gate voltage VBGP and supply voltage Vcc should be carefully determined.

A case where when the predetermined relationship of voltages that the supply voltage Vcc is always equal to or lower than the high-potential back-gate voltage VBGP is established in advance, the reference voltage e1 with which the high-potential back-gate voltage VBGP is controlled and the reference voltage e2 with which the supply voltage Vcc is controlled are dynamically varied independently of each other will be described in conjunction with FIG. 7 and FIG. 8.

A description will be made of a case where, as shown in FIG. 7, the reference voltage e1 is stepped down to get lower than the reference voltage e2 at a time instant t11. Since the reference voltage e2 is lower than the reference voltage e1 by the time instant t11, the differential-input amplifier ERA2 amplifies the difference between the reference voltage e2 and fractional voltage VN2. The supply voltage Vcc therefore assumes a constant value based on the reference voltage e2.

After the time instant t11, the reference voltage e1 is lower than the reference voltage e2. The differential-input amplifier ERA2 therefore amplifies the difference between the reference voltage e1 that is lower than the reference voltage e2 and the fractional voltage VN2. Consequently, the supply voltage Vcc assumes a value based on the reference voltage e1. As shown in FIG. 7, the supply voltage Vcc drops along with the drop of the high-potential back-gate voltage VBGP.

A description will be made of a case where, as shown in FIG. 8, the reference voltage e2 is stepped up to get higher than the reference voltage e1 at a time instant t12. By the time instant t12, the reference voltage e2 is lower than the reference voltage e1. The differential-input amplifier ERA2 therefore amplifies the difference between the reference voltage e2 and fractional voltage VN2. After the time instant t12, the differential-input amplifier ERA2 amplifies the difference between the reference voltage e1 and supply voltage Vcc. The supply voltage Vcc is therefore controlled with the reference voltage e1. Consequently, even if the reference voltage e2 gets higher than the reference voltage e1, the supply voltage Vcc is clamped with the high-potential back-gate voltage VBGP.

Assuming that the predetermined relationship of voltages that the supply voltage Vcc is always equal to or lower than the high-potential back-gate voltage VBGP is established in advance, when the reference voltages e1 and e2 are dynamically varied independently of each other, even if the reference voltage e2 gets higher than the reference voltage e1 due to a control error or failing, the supply voltage Vcc is held equal to or lower than the high-potential back-gate voltage VBGP without fail. Namely, a fail-safe effect can be exerted against the dynamic varying of the supply voltage Vcc and the high-potential back-gate voltage VBGP.

Next, actions to be performed in the DC-DC converter DC3 will be described below. Referring to FIG. 6, the low-potential back-gate voltage VBGN produced by the DC-DC converter DC3 and applied to the input terminal FB3 of the DC-DC converter control circuit 11 is applied to the inverting input terminal of the voltage amplifier AMP 1 via the input resistor R5. The voltage amplifier AMP1 is a polarity inverting circuit that converts the low-potential back-gate voltage VBGN of a negative voltage, which is produced by the DC-DC converter 3, into a positive voltage. Since the resistance of the input resistor R5 and that of the feedback resistor R6 are equal to each other, the output voltage Vx1 of the voltage amplifier AMP1 is a positive voltage equal to the low-potential back-gate voltage VBGN. Namely, the output voltage Vx1 has the same value as the absolute value of the low-potential back-gate voltage VBGN. The output voltage Vx1 is applied as a voltage VN3 to the inverting input terminal of the differential-input amplifier ERA3 via the input resistor R7.

The differential-input amplifier ERA3 is an amplifier that amplifies the difference between the lower one of the reference voltages e1 and e3 applied to the two non-inverting input terminals thereof and the voltage VN3 applied to the inverting input terminal thereof. Consequently, when the reference voltage e3 is lower than the reference voltage e1, the differential-input amplifier ERA3 amplifies the difference between the voltage VN3 applied to the inverting input terminal thereof and the reference voltage e3. On the other hand, when the reference voltage e3 is higher than the reference voltage e1, the differential-input amplifier ERA3 amplifies the difference between the voltage VN3 applied to the inverting input terminal thereof and the reference voltage e1. The other actions are identical to those performed in the DC-DC converter DC1. An iterative description will be omitted.

In the DC-DC converter DC3, the control of the low-potential back-gate voltage VBGN is achieved by varying or controlling the reference voltage e3. When the reference voltage e3 is stepped up, the absolute value of the low-potential back-gate voltage VBGN increases. When the reference voltage e3 is stepped down, the absolute value of the low-potential back-gate voltage VBGN decreases. A description will be made of a case where the predetermined relationship of voltages that when the high-potential back-gate voltage VBGP is 0 V, the low-potential back-gate voltage VBGN to be produced by the DC-DC converter DC3 is also set to 0 V is established in advance. A case where the reference voltage e1 with which the high-potential back-gate voltage VBGP is controlled and the reference voltage e3 with which the low-potential back-gate voltage VBGN is controlled are dynamically varied independently of each other will be described in conjunction with FIG. 9.

A case where the high-potential back-gate voltage VBGP and reference voltage e1 are set to 0 V at the time of terminating the power supply 10 will be described for instance. A description will be made of a case where, as shown in FIG. 9, the reference voltage e1 is stepped down to get lower than the reference voltage e3 at a time instant t13. Since the reference voltage e3 is lower than the reference voltage e1 by the time instant t13, the differential-input amplifier ERA3 amplifies the difference between the reference voltage e3 and voltage VN3. Therefore, the absolute value of the low-potential back-gate voltage VBGN is, as shown in FIG. 9, a constant value based on the reference voltage e3.

Since the reference voltage e1 is lower than the reference voltage e3 after the time instant t13, the differential-input amplifier ERA3 amplifies the difference between the reference voltage e1, which is lower than the reference voltage e3, and the voltage VN3. Consequently, the low-potential back-gate voltage VBGN assumes a value based on the reference voltage e1 and drops along with the drop of the high-potential back-gate voltage VBGP. When the high-potential back-gate voltage VBGP comes to 0 V at a time instant t14, the low-potential back-gate voltage VBGN also comes to 0 V.

Assuming that the predetermined relationship that when the high-potential back-gate voltage VBGP is 0 V, the low-potential back-gate voltage VBGN is set to 0V is established in advance, when the reference voltage e1 and reference voltage e3 are dynamically varied independently of each other, although the reference voltage e1 is 0 V, even if the reference voltage e3 is not set to 0 V due to a control error or failing, the low-potential back-gate voltage VBGN can be set to 0 V without fail. Thus, a fail-safe effect can be exerted against the dynamic varying of the reference voltages e1 and e3.

As described so far, assuming that the predetermined relationship of voltages that the high-potential back-gate voltage VBGP is always equal to or higher than the supply voltage Vcc is established in advance, when the reference voltage e1 with which the supply voltage Vcc is controlled and the reference voltage e2 with which the high-potential back-gate voltage VBGP is controlled are dynamically varied independently of each other, even if the reference voltage e2 gets lower than the reference voltage e1 due to an error or failing, the power supply 10 of the first embodiment can keep the high-potential back-gate voltage VBGP being equal to or higher than the supply voltage Vcc without fail. Namely, a fail-safe effect can be exerted.

Assuming that the predetermined relationship of voltages that when the high-potential back-gate voltage VBGP produced by the DC-DC converter 1 is 0 V, the low-potential back-gate voltage VBGN produced by the DC-DC converter 3 comes to 0 V is established in advance, when the reference voltage e1 with which the high-potential back-gate voltage VBGP is controlled and the reference voltage e3 with which the low-potential back-gate voltage VBGN is controlled are dynamically varied independently of each other, if the high-potential back-gate voltage VBGP is set to 0 V, the low-potential back-gate voltage VBGN can be set to 0 V without fail. Namely, when the high-potential back-gate voltage VBGP is controlled to be 0 V using the reference voltage e1, even if the low-potential back-gate voltage VBGN is controlled to assume any value other than 0 V according to the reference voltage e3, the low-potential back-gate voltage VBGN can be set to 0 V. A fail-safe effect can be exerted.

The second embodiment of the present invention will be described in conjunction with FIG. 10. FIG. 10 shows a power supply 10a of the second embodiment. The power supply 10a includes, in addition to the same components as those of the power supply 10 of the first embodiment, a soft-start capacitor CS, a constant current circuit CC, a resistor RD, and switches SW1 and SW2. Differential-input amplifiers ERA1a to ERA3a each include a non-inverting input terminal to which the capacitor CS is connected. The constant current circuit CC is connected to the capacitor CS via the switch SW1. One terminal of the resistor RD is grounded, and the other terminal thereof is connected to the capacitor CS via the switch SW2. The other components are identical to those of the power supply 10 shown in FIG. 6. An iterative description will be omitted.

As for the first embodiment, the actions to be performed in the steady-state power supply 10 have been described. When the power supply 10 is started, soft-start control is needed in order to prevent occurrence of a rush current. In the power supply 10a shown in FIG. 10, a high-potential back-gate voltage VBGP is regarded as a reference, and a supply voltage Vcc is controlled to be lower than the high-potential back-gate voltage VBGP all the time. In other words, the potential of the supply voltage Vcc relative to the high-potential back-gate voltage VBGP is controlled. The differential-input amplifier ERA2a for the supply voltage Vcc is designed to amplify the difference between the lowest one of reference voltages e1 and e2 and a voltage at the capacitor CS and a fractional voltage VN2 applied to the inverting input terminal thereof.

When the power supply 10a is started, the switch SW1 becomes conducting and the switch SW2 becomes non-conducting. Consequently, the capacitor CS is charged by the constant current circuit CC, and the voltage at the capacitor CS gradually rises from 0 V. At this time, since the voltage at the capacitor CS is equal to the lowest one of the voltages applied to the non-inverting inputs of the differential-input amplifier ERA2a, the supply voltage Vcc is controlled with the voltage at the capacitor CS. The supply voltage Vcc gradually rises along with the progress in the charging of the capacitor CS. After the voltage at the capacitor CS reaches the same value as the reference voltage e2, the supply voltage Vcc is controlled with the reference voltage e2. Likewise, a differential-input amplifier ERA1a controls the high-potential back-gate voltage VBGP using the voltage at the capacitor CS for the purpose of soft start. After the voltage at the capacitor CS reaches the same value as the reference voltage e1, the high-potential back-gate voltage VBGP is controlled with the reference voltage e1.

When the power supply 10a is halted, the switch SW1 becomes non-conducting and the switch SW2 becomes conducting. The capacitor CS is therefore discharged due to the resistor RD. After the voltage at the capacitor CS drops to be lower than the reference voltages e1 to e3, the high-potential back-gate voltage VBGP, supply voltage Vcc, and low-potential back-gate voltage VBGN gradually drop to 0 V because they are controlled with the voltage at the capacitor CS.

As described so far, the power supply 10a of the second embodiment uses the high-potential back-gate voltage VBGP as a reference. Since the method of controlling the supply voltage Vcc so that the supply voltage Vcc will always be lower than the high-potential back-gate voltage VBGP is adopted, the differential-input amplifier ERA2a can be designed to amplify the difference between the lowest one of the voltages applied to the non-inverting input terminals thereof and the fractional voltage VN2 applied to the inverting input terminal thereof. Consequently, since each of the differential-input amplifiers ERA1a to ERA3a additionally include the non-inverting input terminal connected to the capacitor CS, soft-start control is enabled.

Over a series of operations ranging from turning on of the power supply to turning off thereof, that is, from startup of the power supply 10a to halt thereof, it should be guaranteed that the high-potential back-gate voltage VBGP is equal to or higher than the supply voltage Vcc. When the DC-DC converters DC1 and DC2 are started simultaneously, a slope at which the high-potential back-gate voltage VBGP rises during soft start should preferably be larger than a slope at which the supply voltage Vcc rises. Based on the slope of the rise, a fraction to be determined by the input resistor R3 and ground resistor R4 is differentiated from a fraction to be determined by the input resistor R1 and ground resistor R2.

The present invention is not limited to the aforesaid embodiments but can be modified or varied in various manners within the gist of the present invention. The differential-input amplifier ERA2 included in the power supply 10 (FIG. 6) of the first embodiment is an amplifier that amplifies the difference between the lower one of the reference voltages e1 and e2 applied to the two non-inverting input terminals thereof and the fractional voltage VN2 applied to the inverting input terminal thereof. However, the present invention is not limited to this mode. Alternatively, assuming that the DC-DC converter DC1 produces the supply voltage Vcc and the DC-DC converter DC2 produces the high-potential back-gate voltage VBGP, the differential-input amplifier ERA2 may amplify the difference between the higher one of the reference voltages e1 and e2 and the fractional voltage VN2. Consequently, the supply voltage Vcc is adopted as a reference and the high-potential back-gate voltage VBGP is controlled to be always higher than the supply voltage Vcc. Even in this case, when the reference voltage e2 is made higher than the reference voltage e1, the supply voltage Vcc can be held equal to or lower than the high-potential back-gate voltage VBGP all the time.

In the first embodiment, the low-potential back-gate voltage VBGN that is used as a voltage to be applied to the back gate of an n-type MOSFET included in a semiconductor device is a negative voltage. However, the present invention is not limited to this mode. The potential of the low-potential reference voltage Vss to be fed to the semiconductor device may be set to a value larger than the value of a ground potential, and the low-potential back-gate voltage VBGN may be set to the same value as the ground potential. FIG. 11 shows a power supply 10b of a differential output type (floating output type) that feeds both the supply voltage Vcc and low-potential reference voltage Vss. The power supply 10b includes a DC-DC converter DC3b in place of the DC-DC converter DC3 included in the power supply 10. The DC-DC converter DC3b includes a control unit CU3b and a power unit PU3b, and produces the low-potential reference voltage Vss. In the power unit PU3b, an input voltage Vin is applied to the input terminal of a transistor FET6 that serves as a main switching element, and the input terminal of a choke coil L3 is connected to the output terminal of the transistor FET6. The output terminal of the choke coil L3 is connected to the output terminal Vss of the DC-DC converter DC3b. The input terminal of the transistor FET5 serving as a synchronous rectifier switching element is grounded, and the output terminal thereof is connected to the input terminal of the choke coil L3. A smoothing capacitor C3 is connected between the output terminal Vss of the DC-DC converter DC3b and a ground.

The control unit CU3b includes a differential-input amplifier ERA3, a pulse-width modulator (PWM) comparator PWM3, a reference voltage production circuit e3R, an input resistor R8, and a ground resistor R9. The input resistor R8 and ground resistor R9 are connected between the input terminal FB3 and ground via a node N3. The node N3 is connected to the inverting input terminal of the differential-input amplifier ERA1. The other components are identical to those of the control unit CU3 included in the power supply 10 (FIG. 6). An iterative description will be omitted.

The operation of the power supply 10b will be described below. A case where a memory circuit that operates with 2.5 V is interfaced with a control circuit that operates with 1.2 V will be described for instance. The DC-DC converter DC3b feeds the low-potential reference voltage Vss (0.65 V) to the control circuit. Moreover, the DC-DC converter DC2 feeds the supply voltage Vcc (1.85 V) to the control circuit. Moreover, the DC-DC converter DC1 feeds the high-potential back-gate voltage VBGP that is applied to a PMOS transistor included in the control circuit. The low-potential back-gate voltage VBGN to be applied to an NMOS transistor is set to a ground potential.

The power supply 10b steps up the low-potential reference voltage Vss, which is fed to the control circuit, to 0.65 V, and steps up the supply voltage to 1.85 V. Consequently, a half voltage of the supply voltage of the control circuit has the same potential (1.25 V) as a half voltage of the supply voltage of the memory circuit. When the memory circuit transfers a signal with the half voltage of the supply voltage (1.25 V) ±0.2 V, the amplitude range of a voltage in the memory circuit can be confined to the range of operating voltages with which the control circuit operates. Consequently, the memory circuit and control circuit can be interfaced with each other without addition of a circuit that withstands a high voltage.

The present invention can be adapted to the differential output type power supply 10b. Specifically, assuming that the predetermined relationship of voltages that when the high-potential back-gate voltage VBGP produced by the DC-DC converter DC1 is 0 V, the low-potential reference voltage Vss produced by the DC-DC converter DC3b is 0 V is established in advance, when the reference voltages e1 and e3 are dynamically varied independently of each other, if the high-potential back-gate voltage VBGP is set to 0 V, the low-potential reference voltage Vss comes to 0 V without fail.

The DC-DC converters DC1 to DC3 included in the power supply 10 (FIG. 6) of the first embodiment externally receive the input voltage Vin. The present invention is not limited to this mode. Needless to say, an output voltage of one of the plurality of DC-DC converters included in the power supply 10 may be used as the input voltages of the other DC-DC converters. For example, the supply voltage Vcc produced by the DC-DC converter DC2 may be used as the input voltage of the DC-DC converter DC1. The DC-DC converter DC1 may step up the supply voltage Vcc so as to produce the output voltage VGBP. In this case, when the reference voltages e1 and e2 are dynamically varied independently of each other, even if the reference voltage e2 gets higher than the reference voltage e1 due to a control error or failing, the high-potential back-gate voltage VBGP produced by the DC-DC converter DC2 will not unconditionally drop to get lower than the supply voltage Vcc produced by the DC-DC converter DC1. Thus, a fail-safe effect can be exerted.

For example, the DC-DC converter DC2 may step down the high-potential back-gate voltage VBGP, which is produced by the DC-DC converter DC1, in order to produce the supply voltage Vcc. In this case, the supply voltage Vcc produced by the DC-DC converter DC1 will not unconditionally get higher than the high-potential back-gate voltage VBGP produced by the DC-DC converter DC2. Moreover, since the DC-DC converter DC1 serves as a power supplier, the DC-DC converter DC1 can be started earlier than the DC-DC converter DC2 is. Even when the power supply 10 is started, the high-potential back-gate voltage VBGP is prevented from getting lower than the supply voltage Vcc. Eventually, a latch-up can be prevented.

Needless to say, the present invention can be adapted to a system power supply that includes a plurality of DC-DC converters and a unit which organizes and controls the DC-DC converters, and that has the ability to communicate data to a system. FIG. 12 shows a system power supply 20 that feeds a supply voltage Vcc with which a semiconductor device operates, a high-potential back-gate voltage VBGP which is applied to a PMOS transistor, and a low-potential back-gate voltage VBGN, which is applied to an NMOS transistor, to a system 21. The system power supply 20 includes a communication control unit TC and DC-DC converters DC1e to DC3e. A control circuit TCC included in the communication control unit TC is connected to the system 21, and transfers data to or from the system 21. Registers REG1 to REG3 are registers to be used to designate the supply voltage Vcc, high-potential back-gate voltage VBGP, and low-potential back-gate voltage VBGN respectively. When the values stored in the registers are modified in response to a request issued from the system 21, the output voltages of the DC-DC converters DC1e to DC3e are modified accordingly.

The DC-DC converter DC1e produces the supply voltage Vcc. The supply voltage Vcc is applied to the inverting input terminal of a differential-input amplifier ERA1e, and the output voltage of the register REG1 is applied to the non-inverting input terminal thereof. The DC-DC converter DC2e produces the high-potential back-gate voltage VBGP. The high-potential back-gate voltage VBGP is applied to the inverting input terminal of a differential-input amplifier ERA2e. The register REG1 is connected to the first non-inverting input terminal of the differential-input amplifier ERA2e, and the register REG2 is connected to the second non-inverting input terminal thereof. The DC-DC converter DC3e produces the low-potential back-gate voltage VBGN. The low-potential back-gate voltage VBGN is applied to the inverting input terminal of the differential-input amplifier ERA3e. The register REG1 is connected to the first non-inverting input terminal of the differential-input amplifier ERA3e, and the register REG3 is connected to the second non-inverting input terminal thereof. The values in the registers REG1 to REG3 are controlled to be varied independently of one another.

Even if the value of the high-potential back-gate voltage VBGP commanded using the register REG2 is made lower than the value of the supply voltage Vcc, which is commanded using the register REG1, due to a malfunction of the system 21, the high-potential back-gate voltage VBGP is always held equal to or higher than the supply voltage Vcc owing to the same actions as those performed in the first embodiment. Moreover, assuming that the register REG1 is used to control the supply voltage Vcc so that the supply voltage Vcc will be 0 V, when the register REG3 is used to control the low-potential back-gate voltage VBGN so that the low-potential back-gate voltage will assume any value other than 0 V, the low-potential back-gate voltage VBGN can be set to 0 V irrespective of the control extended via the register REG3. Consequently, a fail-safe effect can be exerted against the dynamic varying of the values stored in the registers REG1 and REG2. According to the related art, the control circuit TCC has to monitor three voltages of the supply voltage Vcc, high-potential back-gate voltage VBGP, and low-potential back-gate voltage VBGN. In the system power supply 20 of the present invention, only the supply voltage Vcc should be monitored. A load to be incurred by the system power supply 20 can be reduced.

The power supply 10 (FIG. 6) of the first embodiment produces one high-potential back-gate voltage VBGP and one supply voltage Vcc. The present invention is not limited to this mode. Needless to say, the present invention can be adapted to a power supply that produces a plurality of high-potential back-gate voltages VBGP. A case where a plurality of high-potential back-gate voltages VBGP produced by a power supply is controlled so that the supply voltage Vcc will be always lower than the high-potential back-gate voltages will be described in conjunction with FIG. 13. A power supply 10c shown in FIG. 13 includes DC-DC converters DC11, DC12, and DC21. The DC-DC converter DC11 produces a first high-potential back-gate voltage VBGP1. The first high-potential back-gate voltage VBGP1 is applied to the inverting input terminal of a differential-input amplifier ERA11, and a reference voltage e11 is applied to the non-inverting input terminal thereof. The DC-DC converter DC12 produces a second high-potential back-gate voltage VBGP2. The second high-potential back-gate voltage VBGP2 is applied to the inverting input terminal of a differential-input amplifier ERA12. A reference voltage e12 is applied to the first non-inverting input terminal of the differential-input amplifier ERA12, and the reference voltage e11 is applied to the second non-inverting input terminal thereof. The DC-DC converter DC21 produces a supply voltage Vcc. The supply voltage Vcc is applied to the inverting input terminal of a differential-input amplifier ERA21. A reference voltage e21 is applied to the first non-inverting input terminal of the differential-input amplifier ERA21, the reference voltage e12 is applied to the second non-inverting input terminal thereof, and the reference voltage e11 is applied to the third non-inverting input terminal thereof. The reference voltages e11, e12, and e21 are controlled to be varied independently of one another.

A description will be made of a case where the predetermined relationship of voltages that the supply voltage Vcc is always equal to or lower than the first high-potential back-gate voltage VBGP1 and second high-potential back-gate voltage VBGP2 is established in advance. In this case, the differential-input amplifier ERA12 amplifies the difference between a lower one of the received reference voltages and the second high-potential back-gate voltage VBGP2. Moreover, the differential-input amplifier ERA21 amplifies the difference between the lowest one of the received reference voltages and the supply voltage Vcc. Consequently, when at least one of the reference voltages e11 and e12 is lower than the reference voltage e21, the supply voltage Vcc drops along with the drop of the first high-potential back-gate voltage VBGP1 or second high-potential back-gate voltage VBGP2. Moreover, when the reference voltage e21 is higher than at least one of the reference voltages e11 and e12, the supply voltage Vcc is clamped with the first high-potential back-gate voltage VBGP1 or second high-potential back-gate voltages VBGP2.

A case where a power supply that produces a plurality of high-potential back-gate voltages VBGP is controlled so that the high-potential back-gate voltages VBGP will always be higher than a supply voltage Vcc will be described in conjunction with FIG. 14. A power supply 10d shown in FIG. 14 includes DC-DC converters DC11d, DC21d, and DC22d. The DC-DC converter DC11d produces the supply voltage Vcc. The supply voltage Vcc is applied to the inverting input terminal of a differential-input amplifier ERA11d, and a reference voltage e11d is applied to the non-inverting input terminal thereof. The DC-DC converter DC21d produces the first high-potential back-gate voltage VBGP1d. The first high-potential back-gate voltage VBGP1d is applied to the inverting input terminal of a differential-input amplifier ERA21d. A reference voltage e21d is applied to the first non-inverting input terminal of the differential-input amplifier ERA21d, and a reference voltage e11d is applied to the second non-inverting input terminal thereof. The DC-DC converter DC22d produces the second high-potential back-gate voltage VBGP2d. The second high-potential back-gate voltage VBGP2d is applied to the inverting input terminal of a differential-input amplifier ERA22d. A reference voltage e22d is applied to the first non-inverting input terminal of the differential-input amplifier ERA22d, and the reference voltage e11d is applied to the second non-inverting input terminal thereof. The reference voltages e11d, e21d, and e22d are controlled to be varied independently of one another.

A description will be made of a case where the predetermined relationship of voltages that the high-potential back-gate voltage VBGP1d and second high-potential back-gate voltage VBGP2d are always equal to or higher than the supply voltage Vcc is established in advance. In this case, the differential-input amplifier ERA21d amplifies the difference between a higher one of the received reference voltages and the first high-potential back-gate voltage VBGP1d. The differential-input amplifier ERA22d amplifies the difference between a higher one of the received reference voltages and the second high-potential back-gate voltage VBGP2d. When at least one of the reference voltages e21d and e22d is lower than the reference voltage e11d, the first high-potential back-gate voltage VBGP1d or second high-potential back-gate voltage VBGP2d is clamped with the supply voltage Vcc. If the reference voltage e11d is higher than at least one of the reference voltages e21d and e22d, the first high-potential back-gate voltage VBGP1d or second high-potential back-gate voltage VBGP2d rises along with the rise of the supply voltage Vcc. Consequently, even when a plurality of high-potential back-gate voltages VBGP is produced, a fail-safe effect can be exerted against the dynamic varying of the reference voltages e11d, e21d, and e22d.

The power supply 10a (FIG. 10) of the second embodiment is controlled to achieve soft start by including the soft-start capacitor CS. The present invention is not limited to this mode. Needless to say, the power supply 10 (FIG. 6) may be controlled to achieve soft start by gradually stepping up or down the reference voltage e1. When the power supply 10 is started, the supply voltage Vcc is controlled with the reference voltage e1 until the reference voltage e1 that gradually rises from 0 V reaches the same value as the reference voltage e2. The absolute value of the low-potential back-gate voltage VBGN is controlled with the reference voltage e1 until the reference voltage e1 reaches the same value as the reference voltage e3. Consequently, even when the soft-start capacitor CS is not included, the power supply 10 can be controlled to achieve soft start.

The present embodiment has been described as a voltage-mode DC-DC converter. The present invention is characterized in that the output voltage of the DC-DC converter DC1 is regarded as a reference, and the output voltage of the DC-DC converter DC2 is controlled relative to the output voltage of the DC-DC converter DC1. Specifically, the reference voltage e1 for the DC-DC converter DC1 is also applied to the differential-input amplifier ERA2 included in the DC-DC converter DC2. Needless to say, the present invention can be implemented not only in the voltage-mode DC-DC converter but also in a current-mode DC-DC converter.

Moreover, the DC-DC converter control circuit 11 in accordance with the present invention may be realized using a sole semiconductor chip or a plurality of semiconductor chips. The power supply 10 may be realized with a sole semiconductor chip or a plurality of semiconductor chips. Moreover, the power supply 10 and DC-DC converter control circuit 11 may be constructed in the form of a module. The power supply 10 of the present embodiment may be employed in a system power supply like the system power supply 20 shown in FIG. 12.

The reference voltages e1 to e3 are examples of first to third reference voltages. The high-potential back-gate voltage VBGP is an example of a first output voltage. The supply voltage Vcc is an example of a second output voltage. The low-potential back-gate voltage VBGN is an example of a third output voltage.

According to the DC-DC converter control circuit, DC-DC converter, and DC-DC converter control method in which the present invention is implemented, even when a plurality of output voltages of DC-DC converters is controlled independently of one another, a predetermined relationship of voltages among the output voltages of the DC-DC converters can be maintained. In other words, when the predetermined relationship of voltages is established between the first and second output voltages, a fail-safe effect can be exerted against the dynamic varying of the first and second reference voltages.

What is claimed is:

1. A DC-DC converter control circuit for DC-DC converters, comprising:
   an output voltage control unit that receives a first signal, which represents a target value of a first output voltage, and a second output voltage reference signal, which represents a target value of a second output voltage, and that controls the second output voltage according to the first signal or the second output voltage reference signal so that the second output voltage maintains a desired relationship of potentials established relative to the first output voltage.

2. The DC-DC converter control circuit according to claim 1, wherein:
   the first signal is a first output voltage reference signal which represents the target value of the first output voltage;
   the desired relationship of potentials is a relationship signifying that when the first output voltage reference signal and the second output voltage reference signal are controlled independently, the second output voltage is made lower than the first output voltage; and
   the output voltage control unit is a differential-input amplifier that amplifies the difference between a lower one of the first output voltage reference signal and the second output voltage reference signal, and the second output voltage.

3. The DC-DC converter control circuit according to claim 2, wherein:
   the differential-input amplifier receives a plurality of first output voltage reference signals; and
   the difference between a lowest one from among the first output voltage reference signals and the second output voltage reference signal, and the second output voltage is amplified.

4. The DC-DC converter control circuit according to claim 3, further comprising:
   a soft-start capacitor connected to the differential-input amplifier, wherein:
   the differential-input amplifier selects a voltage of the lowest one, and a voltage at the soft-start capacitor, and amplifies the difference between the selected voltage and the second output voltage.

5. The DC-DC converter control circuit according to claim 1, wherein:
   the desired relationship of potentials is a relationship signifying that when the first signal and the second output voltage reference signal are controlled independently of each other, the second output voltage is made higher than the first output voltage; and the output voltage control unit is a differential-input amplifier that amplifies the difference between a higher one of the first output voltage reference signal and the second output voltage reference signal, and the second output voltage.

6. The DC-DC converter control circuit according to claim 5, further comprising:
a plurality of differential-input amplifiers;
the first signal is applied to each of the differential-input amplifiers; and
the differential-input amplifiers amplify the difference between a higher one of the first signal and the second output voltage reference signal, and the second output voltage.

7. The DC-DC converter control circuit according to claim 1, further comprising:
a first voltage divider that produces a first fraction of the first output voltage; and
a second voltage divider that produces a second fraction of the second output voltage that is the same as the first fraction and outputs the fraction to the output voltage control unit.

8. A DC-DC converter apparatus, comprising:
first and second DC-DC converters;
the second DC-DC converter including
an output voltage control unit that receives a first signal which represents a target value of an output voltage of the first DC-DC converter, and a second signal which represents a target value of an output voltage of the second DC-DC converter, and that controls the output voltage of the second DC-DC converter according to the first signal or the second signal so as to maintain a desired relationship of relative to the first output voltage.

9. The DC-DC converter apparatus according to claim 8, further comprising:
a soft-start capacitor connected to the output voltage control unit, wherein
the output voltage control unit controls the output voltage of the second DC-DC converter according to at least one of the first signal, the second signal, and a voltage at the soft-start capacitor.

10. A DC-DC converter control method, the method comprising:
receiving a first reference signal which represents a target value of a first output voltage;
receiving a second reference signal which represents a target value of a second output voltage; and
controlling the second output voltage to maintain a desired relationship relative to the first output voltage based on the first reference signal or the second reference signal.

11. The DC-DC converter control circuit according to claim 1, wherein the output voltage control unit further receives a feedback signal of the second output voltage.

12. The DC-DC converter apparatus according to claim 8, wherein the output voltage control unit further receives a feedback signal of the second output voltage.

13. The DC-DC converter apparatus according to claim 8, wherein:
the desired relationship is that when the first signal and the second signal are controlled independently, the second output voltage is made lower than the first output voltage; and
the output voltage control unit is a differential-input amplifier that amplifies the difference between a lower one of the first output voltage reference signal and the second output voltage reference signal, and the second output voltage.

14. The DC-DC converter apparatus according to claim 13, wherein:
the differential-input amplifier receives a plurality of first signals; and
the difference between a lowest one from among the first signals and the second output voltage reference signal, and the second output voltage is amplified.

15. The DC-DC converter apparatus according to claim 14, further comprising:
a soft-start capacitor connected to the differential-input amplifier, wherein:
the differential-input amplifier selects a voltage of the lowest one, and a voltage at the soft-start capacitor, and amplifies the difference between the selected voltage and the second output voltage.

16. The DC-DC converter apparatus according to claim 8, wherein:
the desired relationship of potentials is a relationship signifying that when the first signal and the second output voltage reference signal are controlled independently of each other, the second output voltage is made higher than the first output voltage; and
the output voltage control unit is a differential-input amplifier that amplifies the difference between a higher one of the first output voltage reference signal and the second output voltage reference signal, and the second output voltage.

17. The DC-DC converter apparatus according to claim 16, further comprising:
a plurality of differential-input amplifiers;
the first signal is applied to each of the differential-input amplifiers; and
the differential-input amplifiers amplify the difference between a higher one of the first signal and the second output voltage reference signal, and the second output voltage.

18. The DC-DC converter apparatus according to claim 8, further comprising:
a first voltage divider that produces a first fraction of the first output voltage; and
a second voltage divider that produces a second fraction of the second output voltage that is the same as the first fraction and outputs the fraction to the output voltage control unit.

* * * * *